(12) United States Patent
Sloan et al.

(10) Patent No.: US 10,562,623 B1
(45) Date of Patent: Feb. 18, 2020

(54) REMOTELY CONTROLLED VTOL AIRCRAFT

(71) Applicant: BIRDSEYEVIEW AEROBOTICS, LLC, Sutton, NH (US)

(72) Inventors: Adam Riley Sloan, Sutton, NH (US); Nathaniel Miller, Mountain View, CA (US)

(73) Assignee: BirdsEyeView Aerobotics, LLC, Sutton, NH (US)

( * ) Notice: Subject to any disclaimer, the term of this patent is extended or adjusted under 35 U.S.C. 154(b) by 245 days.

(21) Appl. No.: 15/786,793

(22) Filed: Oct. 18, 2017

Related U.S. Application Data

(60) Provisional application No. 62/410,995, filed on Oct. 21, 2016.

(51) Int. Cl.
| | | |
|---|---|---|
| *B64C 39/02* | (2006.01) | |
| *B64D 31/06* | (2006.01) | |
| *B64C 13/18* | (2006.01) | |
| *B64C 13/20* | (2006.01) | |
| *B64C 3/38* | (2006.01) | |
| *G05D 1/00* | (2006.01) | |

(Continued)

(52) U.S. Cl.
CPC .............. *B64C 39/024* (2013.01); *B64C 3/38* (2013.01); *B64C 13/18* (2013.01); *B64C 13/20* (2013.01); *B64C 25/10* (2013.01); *B64C 29/0033* (2013.01); *B64D 31/06* (2013.01); *G05D 1/0011* (2013.01); *B64C 2201/021* (2013.01); *B64C 2201/027* (2013.01); *B64C 2201/102* (2013.01); *B64C 2201/108* (2013.01); *B64C 2201/146* (2013.01); *B64C 2211/00* (2013.01)

(58) Field of Classification Search
CPC ....... B64C 39/024; B64C 13/18; B64C 13/20; B64C 25/10; B64C 3/38; B64C 29/0033; B64C 2211/00; B64C 2201/021; B64C 2201/146; B64C 2201/108; B64C 2201/102; B64C 2201/027; B64D 31/06; G05D 1/0011
See application file for complete search history.

(56) References Cited

U.S. PATENT DOCUMENTS

| | | |
|---|---|---|
| 1,783,458 A | 12/1930 | Windsor |
| 2,825,514 A | 3/1958 | Focke |

(Continued)

OTHER PUBLICATIONS

Carlson, Stephen, "A Hybrid Tricopter/Flying-Wing VTOL UAV." AIAA SciTech Forum, Jan. 13-17, 2014, National Harbor, Maryland (Year: 2014) (pp. 1-11).

(Continued)

*Primary Examiner* — Frederick M Brushaber
(74) *Attorney, Agent, or Firm* — Iandiorio Teska & Coleman, LLP

(57) ABSTRACT

A remotely controlled VTOL aircraft includes an autopilot subsystem outputting helicopter control signals, and an autopilot subsystem outputting fixed wing control signals. A transition control subsystem is configured to receive said helicopter control signals, said fixed wing control signals, and a transition control signal. Control signals to be applied to the VTOL aircraft controls are calculated as a function of the transition percentage and weighting factors applied to the helicopter control signals and said fixed wing control signals.

23 Claims, 22 Drawing Sheets

(51) Int. Cl.
*B64C 29/00* (2006.01)
*B64C 25/10* (2006.01)

(56) References Cited

U.S. PATENT DOCUMENTS

| | | | | |
|---|---|---|---|---|
| 3,008,665 | A * | 11/1961 | Piasecki | B64B 1/00 244/2 |
| 3,246,861 | A * | 4/1966 | Curci | B64C 29/0033 244/7 A |
| 3,563,496 | A * | 2/1971 | Zuck | B64C 27/026 244/7 A |
| 4,457,479 | A | 7/1984 | Daude | |
| 5,067,668 | A * | 11/1991 | Zuck | B64C 27/22 244/17.19 |
| 5,765,783 | A * | 6/1998 | Albion | B64C 29/02 244/17.23 |
| 6,382,556 | B1 * | 5/2002 | Pham | B64C 27/28 244/6 |
| 6,626,397 | B2 | 9/2003 | Yifrach | |
| 6,669,137 | B1 * | 12/2003 | Chen | B64C 3/40 244/7 R |
| 7,182,297 | B2 | 2/2007 | Jackson | |
| 7,262,395 | B2 | 8/2007 | Bilyk et al. | |
| 7,472,863 | B2 | 1/2009 | Pak | |
| 7,510,142 | B2 | 3/2009 | Johnson | |
| 7,980,510 | B2 | 7/2011 | Tanabe et al. | |
| 7,997,526 | B2 | 8/2011 | Greenley | |
| 8,052,081 | B2 | 11/2011 | Olm et al. | |
| 8,434,710 | B2 | 5/2013 | Hothi et al. | |
| 8,500,067 | B2 | 8/2013 | Woodworth et al. | |
| 8,544,787 | B2 * | 10/2013 | Lee | B64C 29/0033 244/12.4 |
| 8,602,348 | B2 | 12/2013 | Bryant | |
| 8,720,814 | B2 | 5/2014 | Smith | |
| 8,721,383 | B2 | 5/2014 | Woodworth et al. | |
| 8,905,358 | B2 | 12/2014 | Abershitz | |
| 8,950,698 | B1 * | 2/2015 | Rossi | B64C 37/02 244/2 |
| 8,998,127 | B2 * | 4/2015 | Sonneborn | B64C 27/025 244/17.11 |
| 9,022,313 | B2 * | 5/2015 | Sonneborn | B64C 27/26 244/17.11 |
| 9,045,226 | B2 * | 6/2015 | Piasecki | G05D 1/102 |
| 9,187,174 | B2 | 11/2015 | Shaw | |
| 9,272,784 | B2 | 3/2016 | Nelson | |
| 9,540,100 | B2 | 1/2017 | Dekel et al. | |
| 9,540,101 | B2 * | 1/2017 | Paduano | B64C 13/16 |
| 9,567,088 | B2 * | 2/2017 | Godlasky | B64D 27/02 |
| 9,616,994 | B2 * | 4/2017 | Kereth | B64C 27/10 |
| 9,616,995 | B2 * | 4/2017 | Watkins | B64C 5/02 |
| 9,676,479 | B2 | 6/2017 | Brody et al. | |
| 9,731,818 | B2 | 8/2017 | Dekel et al. | |
| 9,783,291 | B2 | 10/2017 | Kummer et al. | |
| 9,834,305 | B2 * | 12/2017 | Taylor | B64C 39/024 |
| 9,878,786 | B2 | 1/2018 | Chan et al. | |
| 9,902,491 | B2 | 2/2018 | Chan et al. | |
| 9,950,789 | B2 * | 4/2018 | Tsunekawa | B64C 27/20 |
| 10,054,958 | B2 * | 8/2018 | Creasman | B64C 3/546 |
| 10,071,801 | B2 | 9/2018 | North et al. | |
| 2007/0246601 | A1 | 10/2007 | Layton | |
| 2008/0011899 | A1 * | 1/2008 | Amit | B64C 29/0075 244/12.4 |
| 2009/0256026 | A1 * | 10/2009 | Karem | B64C 27/08 244/99.2 |
| 2010/0044499 | A1 | 2/2010 | Dragan et al. | |
| 2010/0108801 | A1 | 5/2010 | Olm et al. | |
| 2010/0120321 | A1 | 5/2010 | Rehkemper et al. | |
| 2010/0123047 | A1 | 5/2010 | Williams | |
| 2012/0091257 | A1 | 4/2012 | Wolff et al. | |
| 2012/0168556 | A1 * | 7/2012 | Sonneborn | B64C 27/025 244/17.23 |
| 2012/0168568 | A1 * | 7/2012 | Sonneborn | B64C 27/26 244/7 R |
| 2012/0298790 | A1 * | 11/2012 | Bitar | B64C 27/12 244/17.11 |
| 2013/0092799 | A1 | 4/2013 | Tian et al. | |
| 2013/0099065 | A1 | 4/2013 | Stuhlberger | |
| 2013/0287577 | A1 | 10/2013 | Lin et al. | |
| 2014/0263822 | A1 | 9/2014 | Malveaux | |
| 2015/0028151 | A1 | 1/2015 | Bevirt et al. | |
| 2015/0028155 | A1 | 1/2015 | Reiter | |
| 2015/0210388 | A1 | 7/2015 | Criado et al. | |
| 2016/0046369 | A1 * | 2/2016 | Watkins | B64C 5/02 244/7 A |
| 2016/0052626 | A1 * | 2/2016 | Vander Mey | B64C 27/02 244/17.11 |
| 2016/0311528 | A1 | 10/2016 | Nemovi et al. | |
| 2017/0240274 | A1 | 8/2017 | Regev | |
| 2017/0349272 | A1 | 12/2017 | Laurent et al. | |
| 2018/0370624 | A1 * | 12/2018 | Seale | B64C 27/24 |

OTHER PUBLICATIONS

Carlson, Stephen, "Hybrid Version 1, Aug. 2012." Website: https://diydrones.com/photo/p1010118small?context=user. Aug. 2012. 4 pages (Year: 2012).

Carlson, Stephen, "Introducing the "Orange Hawk" Tricopter/Flying-Wing VTOL UAV", Mar. 17, 2013. Website: https//diydrones.com/profiles/blogs/the-orange-hawk-tricopter-flying-wing-vtol-uav. Six (6) pages.

Carlson, Stephen, "Introducing the "Orange Hawk" Tricopter/Flying-Wing VTOL UAV", Mar. 17, 2013. Website: https://diydrones.com/profiles/blogs/the-orange-hawk-tricopter-flying-wing-vtol-uav?id=705844%3ABlogPost%3A-1168869&page=2#comments. Eight (8) pages.

Carlson, Stephen, "Introducing the "Orange Hawk" Tricopter/Flying-Wing VTOL UAV", Mar. 17, 2013. Website: https://diydrones.com/profiles/blogs/the-orange-hawk-tricopter-flying-wing-vtol-uav?id=705844%3ABlogPost%3A1168869&page=3#comments. Seven (7) pages.

Carlson, Stephen, "Introducing the "Orange Hawk" Tricopter/Flying-Wing VTOL UAV", Mar. 17, 2013. Website: diydrones.com/profiles/blogs/the-orange-hawk-tricopter-flying-wing-vtol-uav?id=705844%3ABlogPost%3A1168869&page=4#comments. Nine (9) pages.

U.S. Patent and Trademark Office, Office Action, dated Dec. 27, 2018, for U.S. Appl. No. 15/089,651. Twenty-two (22) pages.

* cited by examiner

REMOTELY CONTROLLED VTOL AIRCRAFT

RELATED APPLICATIONS

This application claims benefit of and priority to U.S. Provisional Application Ser. No. 62/410,995 filed Oct. 21, 2016, under 35 U.S.C. §§ 119, 120, 363, 365, and 37 C.F.R. § 1.55 and § 1.78, which is incorporated herein by this reference.

FIELD OF THE INVENTION

The present disclosure is in the technical field of unmanned aerial vehicles.

BACKGROUND OF THE INVENTION

Conventional unmanned aerial vehicles are typically either configured as fixed wing airplanes or rotary wing helicopters. Fixed wing airplanes excel at flight endurance, range, and speed but are limited by the large amount of space that is required for takeoff and landing and must always continue forward, often at significant speeds, thus limiting their ability to maneuver through tight spaces. Conversely, rotary wing helicopters excel at minimizing required takeoff and landing space and can stop in a midair hover and are thus more maneuverable than fixed wing airplanes but have limited flight endurance and range.

In recent years, a new class of unmanned aerial vehicles broadly known as multicopters or vertical take-off and landing (VTOL) aircraft have emerged which mimic a helicopter's hover and vertical takeoff and landing capabilities with less mechanical complexity and are often quite agile in flight.

Many inexpensive UAVs are fragile and/or difficult to control. UAVs which are more rugged and/or easier to control are typically expensive. Flight controllers are available from different sources including hovering flight controllers and forward flight controllers. These flight controllers generally make it easier to control an UAV. But, the transition between the hover and the forward flight modes can be difficult. See U.S. Pat. Nos. 3,193,218, 6,882,889, 7,946,582, Published U.S. Patent Application 2014/0339354, Canadian Patent No. 2571372 and Hardware-in-the-Loop Testing of the V-22 Flight Control System Using Piloted Simulation by C. Robinson et al. Presented at the AIAA Flight Simulation Technologies Conference, Boston, Mass. Aug. 14-16, 1989 all incorporated herein by this reference.

SUMMARY OF THE INVENTION

A flight control system can operate in either hover or forward flight mode. There is also a third flight regime that exists between the two. This third regime is called transition. When transitioning, the flight control system is between hover and forward flight modes. From a controls perspective, the transition process is extremely challenging. Standard hover and forward flight control systems are inadequate to control the aircraft during the transition. A whole new method of control had to be designed.

Historically, aircraft that have transitioned have been manually controlled during the entire transition. The AV8 Harrier, one of the better known VTOL fixed-wing military aircraft, relies on the pilot to manually adjust nozzle angles to control the aircraft. This task is difficult even for experienced pilots as evidenced by the fact that almost half of all Harriers manufactured have since been crashed.

As a more modern example, the V-22 Osprey has a flight control system which provides much assistance during the transition process. However, the Osprey still has a mechanically sophisticated swash plate actuation system in each rotor which is expensive and difficult to maintain.

The F-35B aircraft uses a sophisticated Nonlinear Dynamic Inversion (NDI) method. See U.S. Pat. No. 6,882,889 incorporated herein by this reference. While this system works well, as with all forms of model predictive control, it requires a high fidelity mathematical model of the aircraft. Modeling an aircraft at the needed level of fidelity is cost prohibitive outside of budgets scaled for national defense.

Featured is a remotely controlled VTOL aircraft including an autopilot subsystem outputting helicopter control signals and an autopilot subsystem outputting fixed wing control signals. A transition control subsystem is configured to receive the helicopter control signals, the fixed wing control signals, and a transition control signal and includes computer instructions which automatically: calculate control signals to be applied to the VTOL aircraft controls as a function of the transition percentage and weighting factors applied to the helicopter control signals and the fixed wing control signals, and apply the calculated control signals to the VTOL aircraft controls during a transition period.

In a transition from the hover flight mode to the forward flight mode, the controller may be programmed to increase the airspeed of the aircraft and then apply the calculated control signals. In a transition from the hover flight mode to the forward flight mode, the computer instructions may decrease the weighting factors applied to the helicopter control signals and may increase the weighting factors applied to the fixed wing control signals. In a transition from the forward flight mode to the hover flight mode, the computer instructions may increase the weighting factors applied to the helicopter control signals and may decrease the weighting factors applied to the fixed wing control signals. In a transition from the forward flight mode to the hover flight mode, the computer instructions may suppress any navigation controls for a predetermined period of time.

In one example, the VTOL aircraft may include right and left forward propeller motors and props on a transition axle rotatable via a motor. The control subsystem may be programmed to control the motor to rotate the transition axle during the transition. The transition axle may be rotated at a constant speed during the transition period.

In one example, the remotely controlled VTOL aircraft may further include an aft propeller motor and right and left elevon motors. The control signals may be calculated for and applied to the right and left forward propeller motors, the aft propeller motor, and the right and left elevon motors. The autopilot subsystem outputting helicopter control signals may control the pitch of the VTOL aircraft via a difference between the rpm of the forward and aft propellers and may control the roll via a difference between the rpm of the left and right propeller. There may be forward right, left, and aft counter rotating upper and lower propeller motors and props and the autopilot subsystem outputting helicopter control signals may control the yaw of the VTOL aircraft via a difference between the rpm of the counter rotating propellers. The autopilot subsystem outputting fixed wing control signals may control the pitch and roll of the VTOL aircraft by adjusting the right, left, elevon motors and may control the yaw of the VTOL aircraft by differentially adjusting the rpm of the right and left forward propeller motors.

The aircraft in one example may further include a fuselage, removable wings coupled to the fuselage, retractable landing gear, and a wireless receiver for receiving command signals. The wings and fuselage may be predominately made of foam. The VTOL may further include a removable tail section upstanding from and magnetically coupled to each wing. The fuselage may include a frame portion. The VTOL aircraft may further include one or more spars extending from the frame portion to within each wing. The one or more spars may be in sections for decoupling each wing from the fuselage.

The VTOL aircraft may further include a thrust vectoring subsystem responsive to a nose down pitch command and may include computer instructions which automatically calculate a forward prop deflection angle as a function of the nose down pitch angle and deflect the forward props to the calculated deflection angle by rotating the transition axle. The VTOL aircraft may further include one or more aerodynamic control surfaces. The aerodynamic control surfaces may include elevons. The VTOL aircraft may further include a forward flight trimming subsystem configured to rotate the transition axle in a forward flight mode to maintain an efficient trim configuration for the aerodynamic control surfaces. The forward flight trimming subsystem may rotate the transition axle to provide a nose up torque and automatically streamlines the aerodynamic control surfaces.

Also featured is a method of controlling a remotely controlled VTOL aircraft, the method including controlling the VTOL aircraft in a hover mode using helicopter control signals, controlling the VTOL aircraft in a forward flight mode using fixed wing control signals, and controlling the VTOL aircraft in a transition mode by calculating control signals to be applied to the controls of the VTOL aircraft as a function of a transition percentage and weighting factors applied to the helicopter control signals and fixed wing control signals, and applying the calculated control signals to the VTOL aircraft controls during the transition period.

In a transition from hover flight mode to forward flight mode, the airspeed of the aircraft may be increased and then the calculated control signals may be applied. In a transition from the hover flight mode to the forward flight mode the weighting factors applied to the helicopter control signals may be decreased and the weighting factors applied to the fixed wing control signals may be increased. In a transition from the forward flight mode to the hover flight mode, the weighting factors applied to the helicopter control signals may be increased and the weighting factors applied to the fixed wing control signals may be decreased.

Also featured is a remotely controlled VTOL aircraft including a forward rotatable prop axle with at least one right and one left prop, a flight controller subsystem outputting helicopter control signals, a flight controller subsystem outputting fixed wing control signals and a transition control subsystem configured to receive the helicopter control signals, the fixed wing control signals, and a transition control signal. The transition control subsystem computer instructions automatically calculate control signals to be applied to the VTOL aircraft controls as a function of the transition percentage, the helicopter control signals, and the fixed wing control signals, apply the calculated control signals to the VTOL aircraft controls during a transition period, and rotate the forward prop axle during the transition period.

The remotely controlled VTOL aircraft may further include a thrust vectoring subsystem responsive to a nose down pitch command and including computer instructions which automatically calculate a forward prop deflection angle as a function of the nose down pitch angle and rotate the prop axle in accordance with the calculated deflection angle. The VTOL aircraft may further include one or more aerodynamic control surfaces. The aerodynamic control surfaces may include elevons. The VTOL aircraft may further include a forward flight trimming subsystem configured to rotate the transition axle in a forward flight mode to maintain an efficient trim configuration for the aerodynamic control surfaces. The forward flight trimming subsystem may rotate the transition axle to provide a nose up torque and may automatically streamline the aerodynamic control surfaces.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
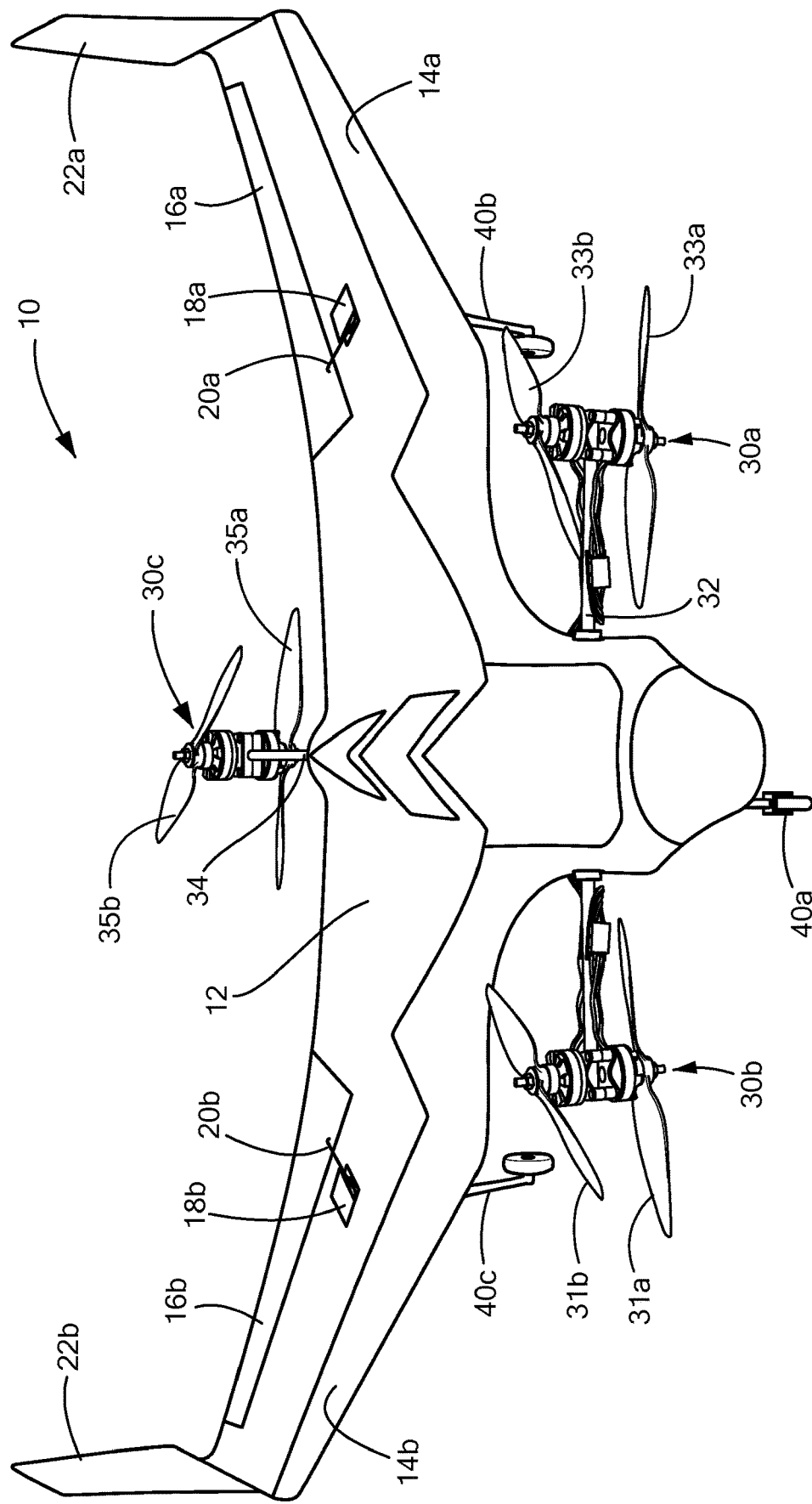
FIG. 1 is a three dimensional schematic top view showing one embodiment of a preferred UAV.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

In one preferred embodiment, UAV 10, FIG. 1 includes fuselage or body 12, left wing 14a, and right wing 14b. Wings 14 may each include an elevon 16a, 16b each controlled by a respective elevon servo motor 18a, 18b connected to the elevon by a linkage 20a, 20b. Each wing may include a vertical tail section 22a, 22b. Forward left 30a and forward right 30b propulsion units may be mechanically coupled together via a carbon rod 32 which rotates relative to fuselage 12 to position the forward propulsion units in the upward facing position shown in FIG. 1 for takeoff and landing and then to the forward facing position shown in FIG. 2 for forward flight. Rear propulsion unit 30c is mechanically coupled to fuselage 12 via carbon rod 34. Typically, rear propulsion unit 30c is fixed in the upward facing position. In this example, rear propulsion unit 30c is used for creating vertical lift only and, in the forward flight mode, the rear propulsion unit is deactivated. Each propulsion unit may include upper and lower counter rotating propellers as discussed below, e.g., forward lower right prop 31a, forward upper right prop 31b, forward lower left prop 33a, forward upper left prop 33b, and aft lower prop 35a and aft upper prop 35b each driven by its own motor. Also featured is retractable landing gear here shown including nose wheel assembly 40a and wing mounted landing gear assemblies 40b and 40c.

Figure 2:
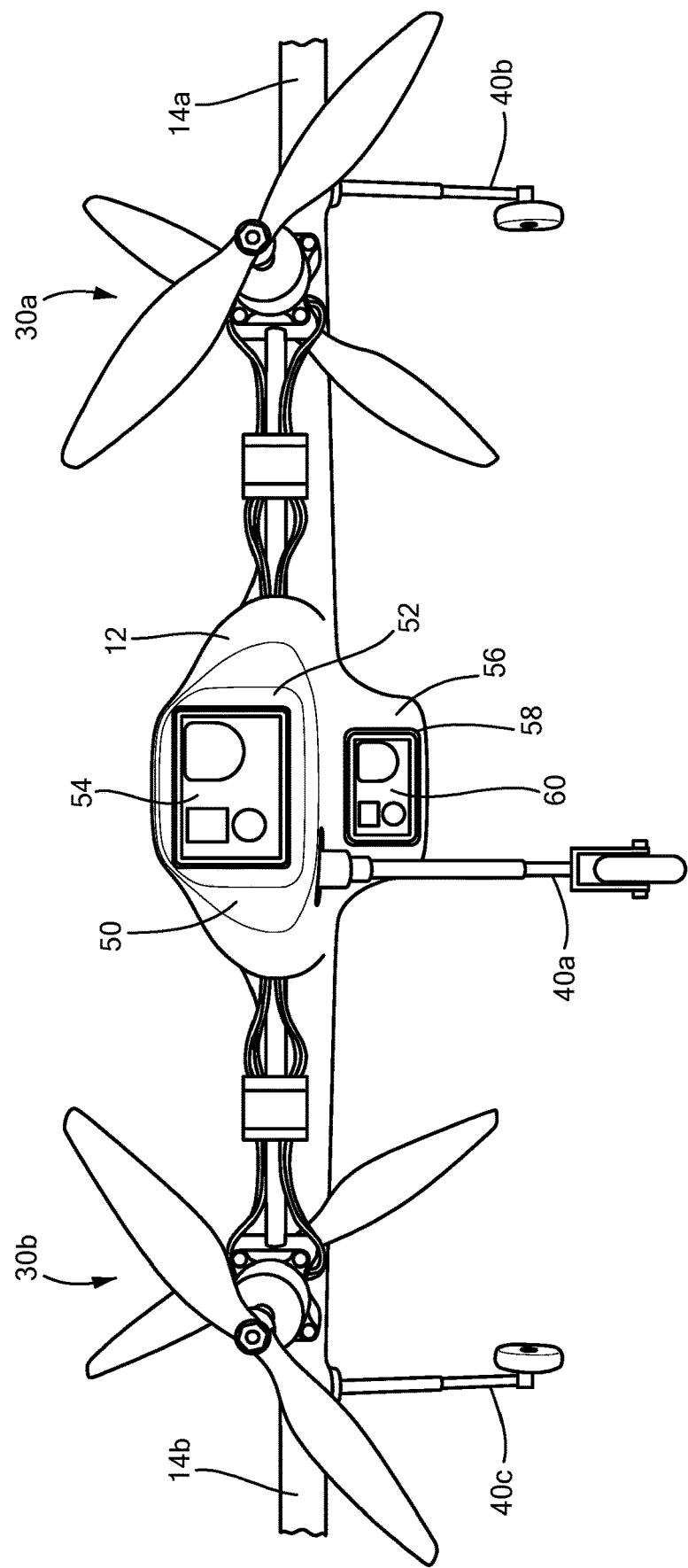
FIG. 2 is a front view of the UAV shown in FIG. 1.

In some versions, fuselage 12, FIG. 2 may include features for mounting video cameras such as nose section 50 with a forward cavity 52 configured to receive a GroPro video camera (or similar) 54 and a lower central fuselage longitudinal reinforcement 56 with a forward cavity 58 configured to hold another video camera 60.

Figure 3:
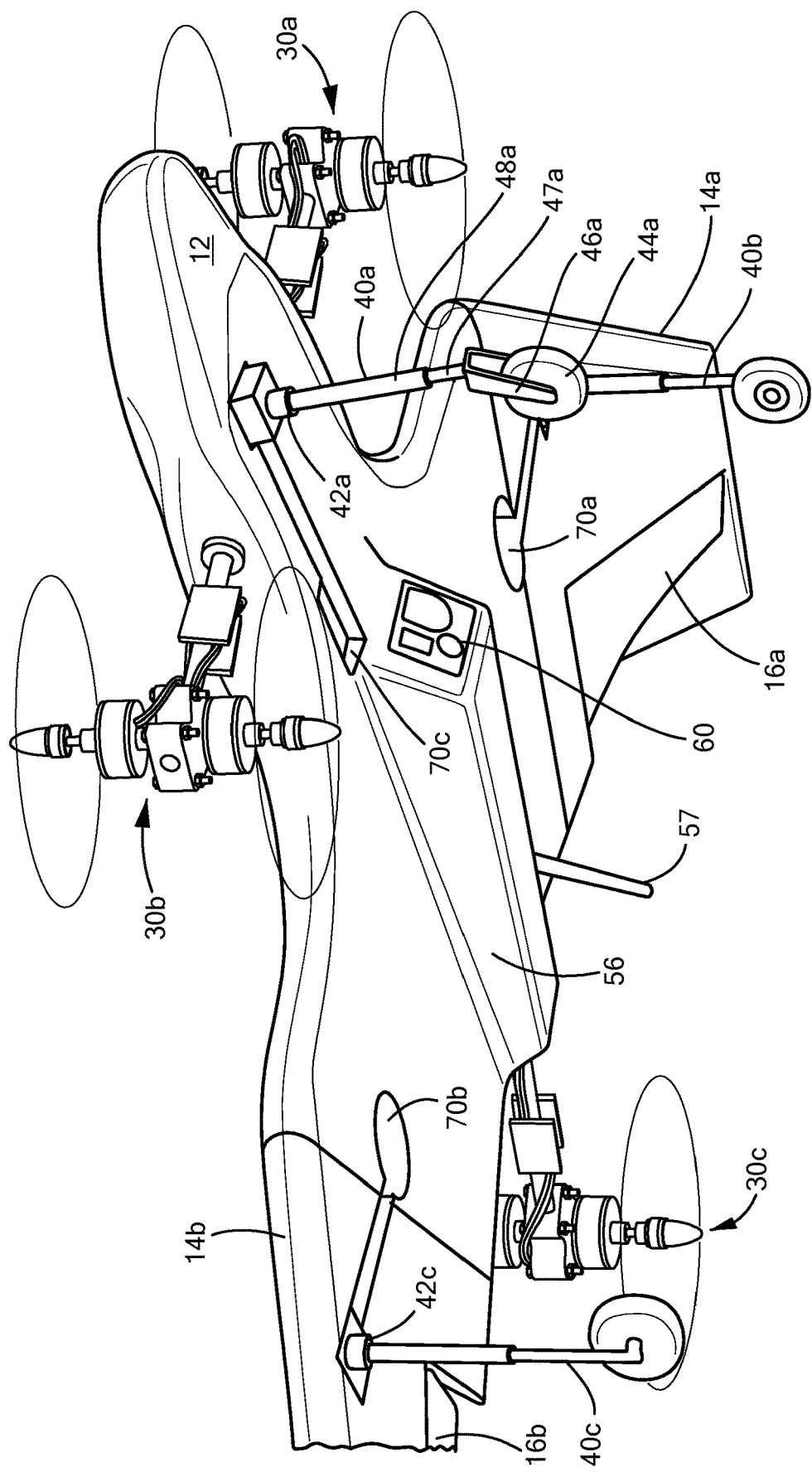
FIG. 3 is a three dimensional schematic bottom view of the UAV shown in FIGS. 1-2.
Figure 4:
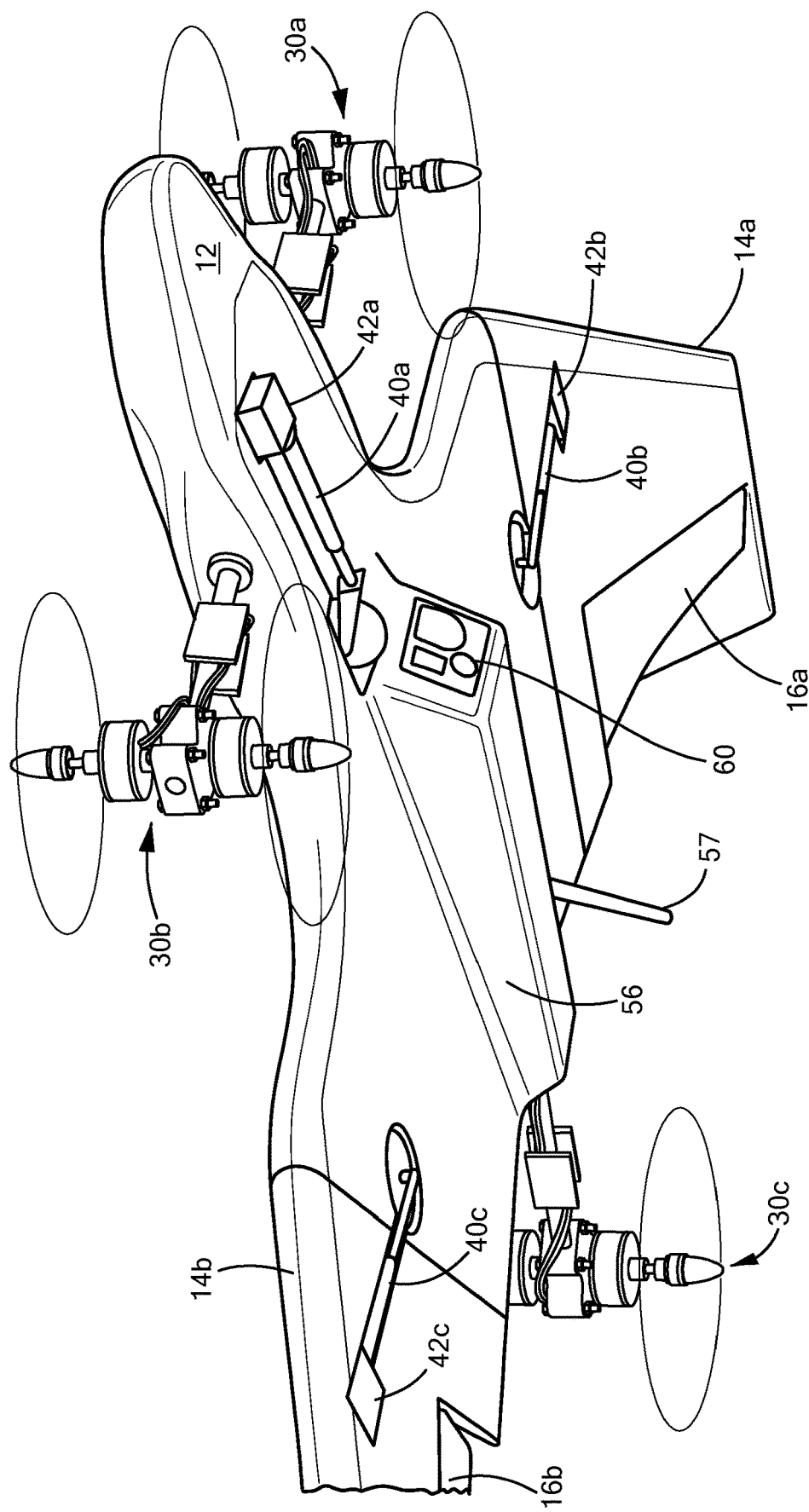
FIG. 4 is a schematic view of the UAV shown in the hovering mode with the landing gear retracted.

Each landing gear assembly preferably includes a retraction motor 42a, 42b, and 42c, respectively, FIGS. 3-4 for retracting the landing gear as shown in FIG. 4. Each landing gear assembly may include, as shown for landing gear assembly 40a, a wheel 44a, a fixed (or rotatable) caster 46a, and piston 47a spring loaded into cylinder 48a. Each wing may include recess 70a, 70b configured to receive a wing mounted landing gear assembly wheel therein and fuselage 12 may include recess 70c configured to receive nose wheel 44a therein.

Optional antenna 57 may be used in conjunction with an on-board digital transceiver to provide to the user various data such as altitude, air speed, battery status information, and the like via wireless communications. Also, a video transmitter may be included to wirelessly transmit video images from cameras 60 and 54 to the operator.

Figure 5:
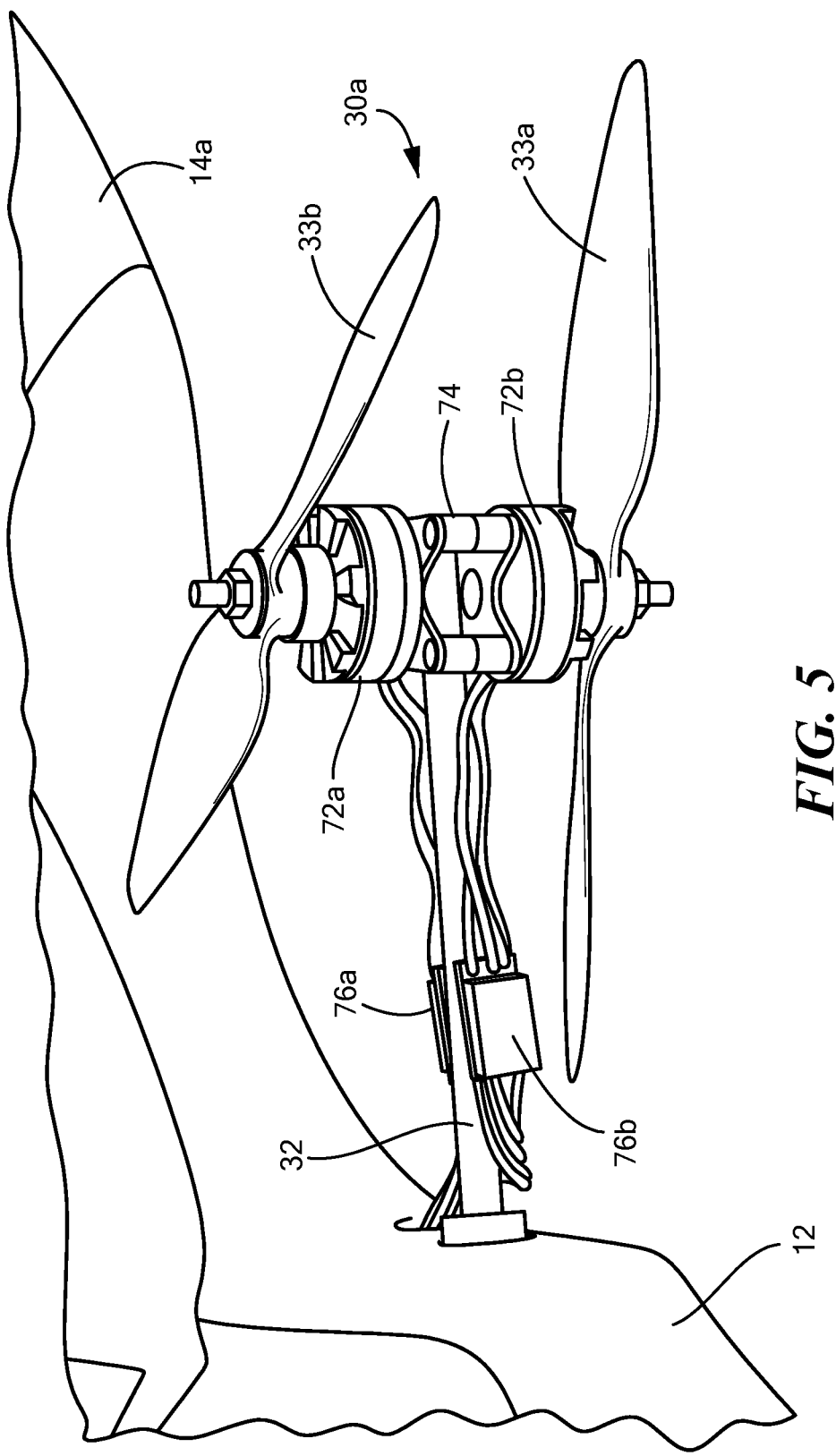
FIG. 5 is schematic three dimensional front view of a preferred forward propulsion unit.

As shown in FIG. 5 for left front propulsion unit 30a mounted to carbon rod 32, propeller 33b is driven by motor 72a and propeller 33a is driven by motor 72b. Fixture 74 is coupled to rod 32 and motors 72a and 72b are coupled to fixture 74. Each motor has its associated wires and electronic speed control circuit chip 76a, 76b mounted to rod 32.

Figure 6:
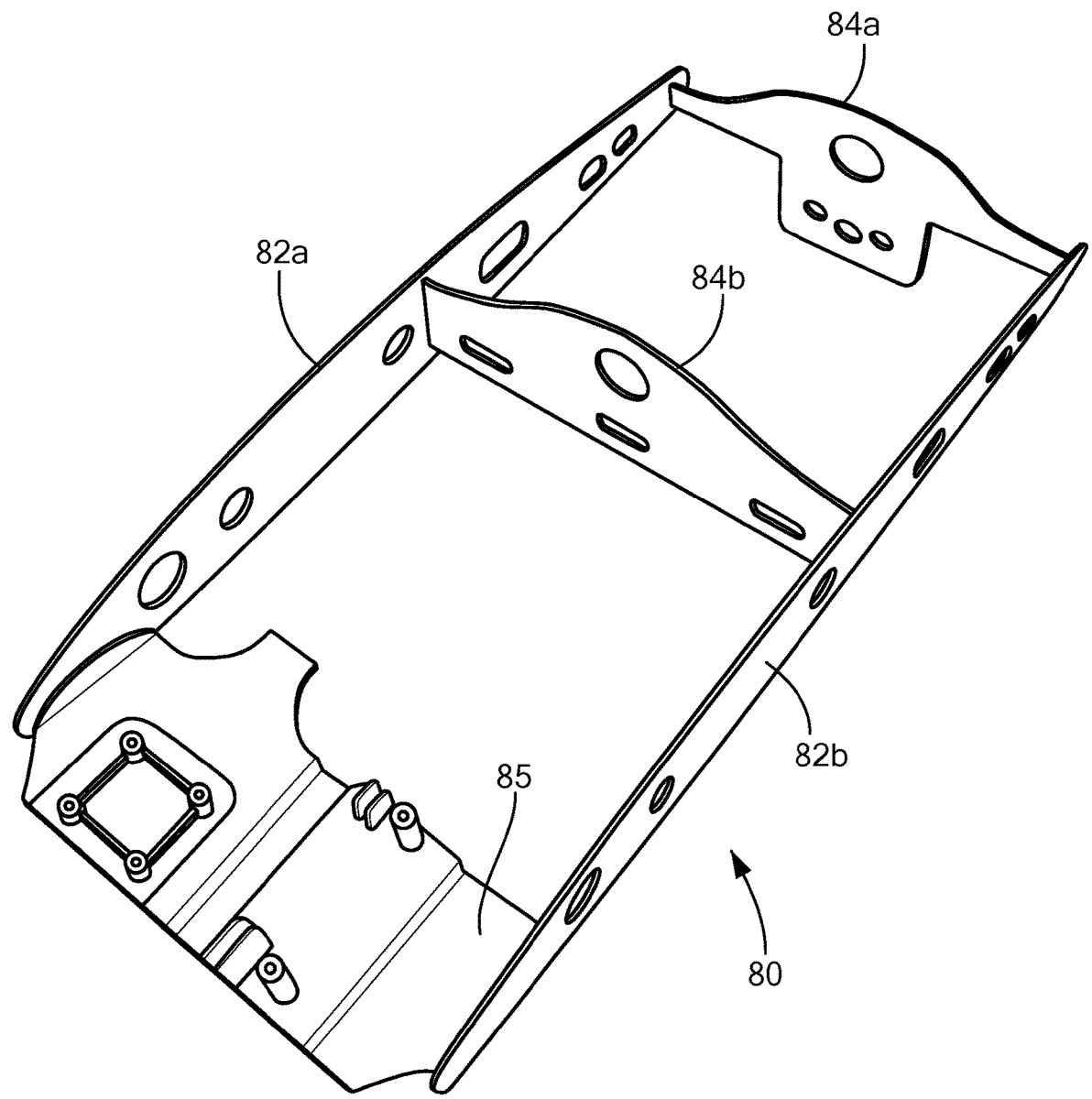
FIG. 6 is a schematic three dimensional top view of a preferred frame for the UAV.

The majority of the fuselage, wings, and tail structures are made of light-weight (e.g., EPO) foam resulting in a lighter weight UAV. For strength, the fuselage preferably includes frame 80, FIG. 6-7 including birch plywood ribs 82a, 82b; spar members 84a, 84b; and plastic tray 85. These components may be used to support the various tubes, rods, drives, electronics, and the like. For example, the space between members 84a and 84b may house the electronics associated with the UAV. Members 82a and 82b, FIGS. 7-8 each include a bearing 85a, 85b for rod 32 and orifices for wing carbon tube support/reinforcement spars 86a, 86b, 86c, and 86d. Rods 86 may be in sections with a smaller diameter removable center section inserted into larger diameter end sections. Rear spar 84a includes an orifice for receiving carbon rod 34 coupled to rear propulsion unit 30c.

Figure 7:
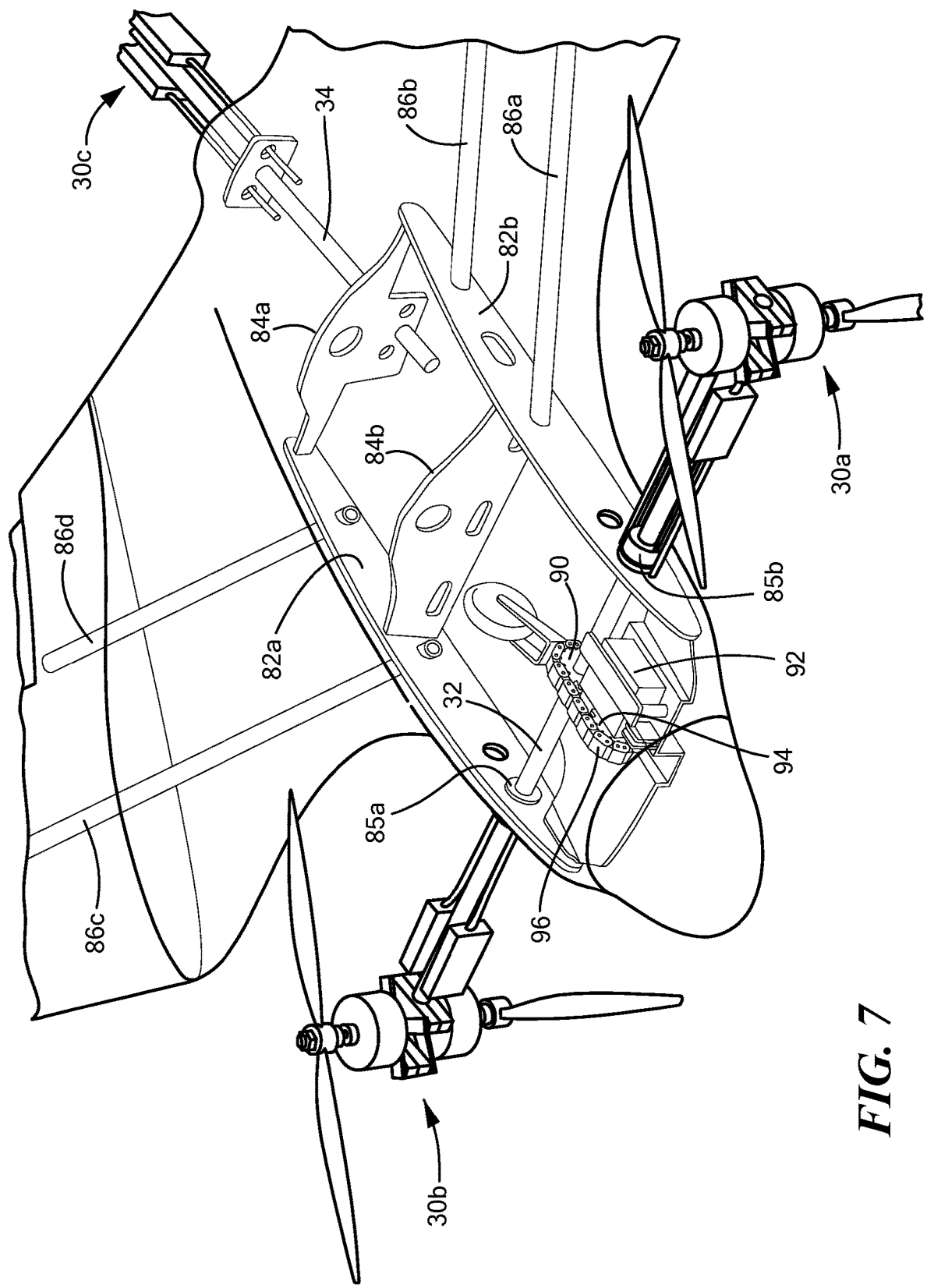
FIG. 7 is schematic view showing the frame of FIG. 6 mounted in the fuselage.
Figure 8:
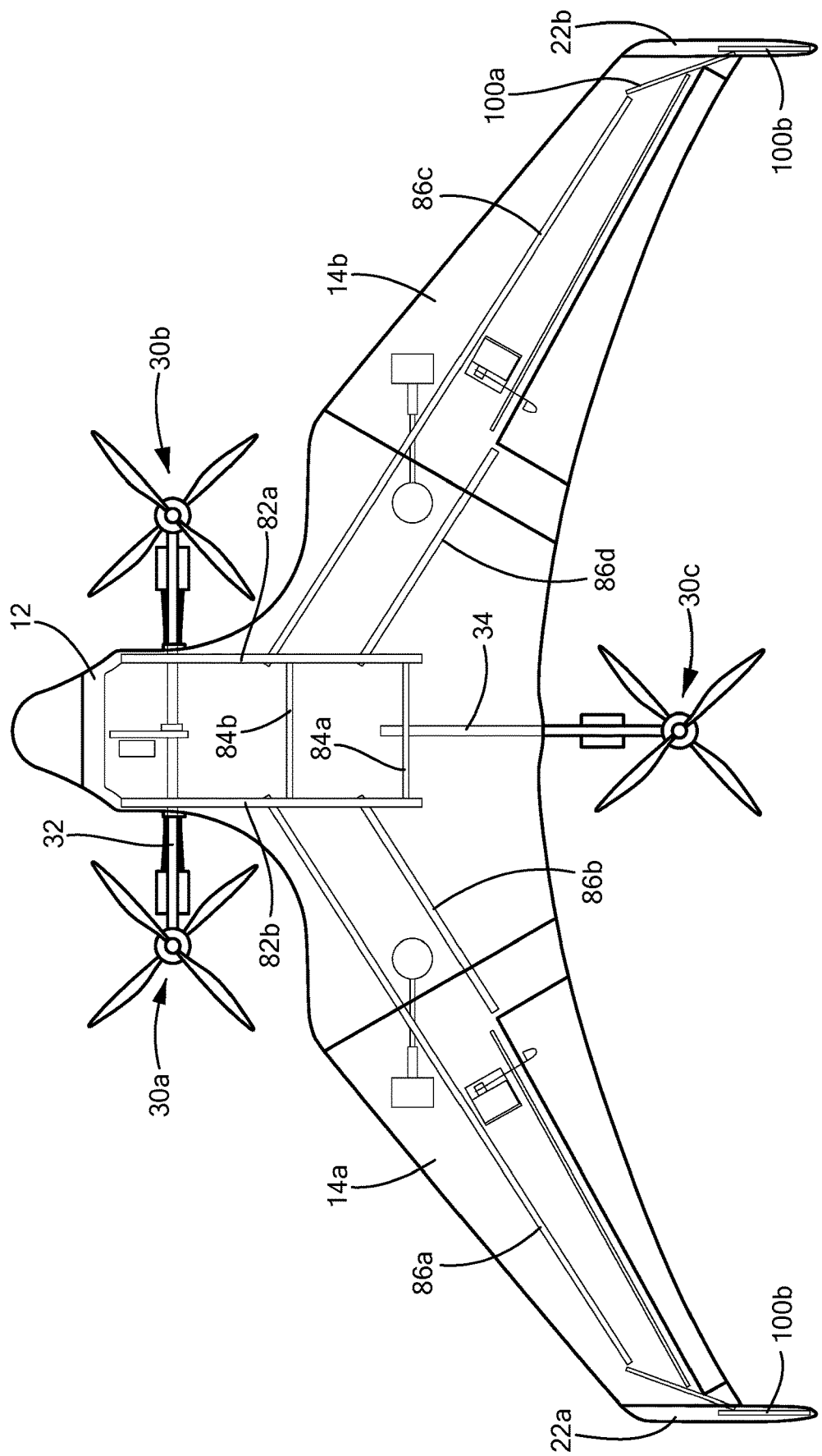
FIG. 8 is a schematic top view showing the frame and the various UAV reinforcements.

To tilt the forward propulsion units, rod 32, FIG. 7 is coupled to gear 90 driven by motor 92 via gear 94 and chain 96. Other means are possible for rotating rod 32 relative to the fuselage chassis. FIG. 8 also shows square carbon tube support elements 100a, 100b for tail sections 22a, 22b.

Figure 9:
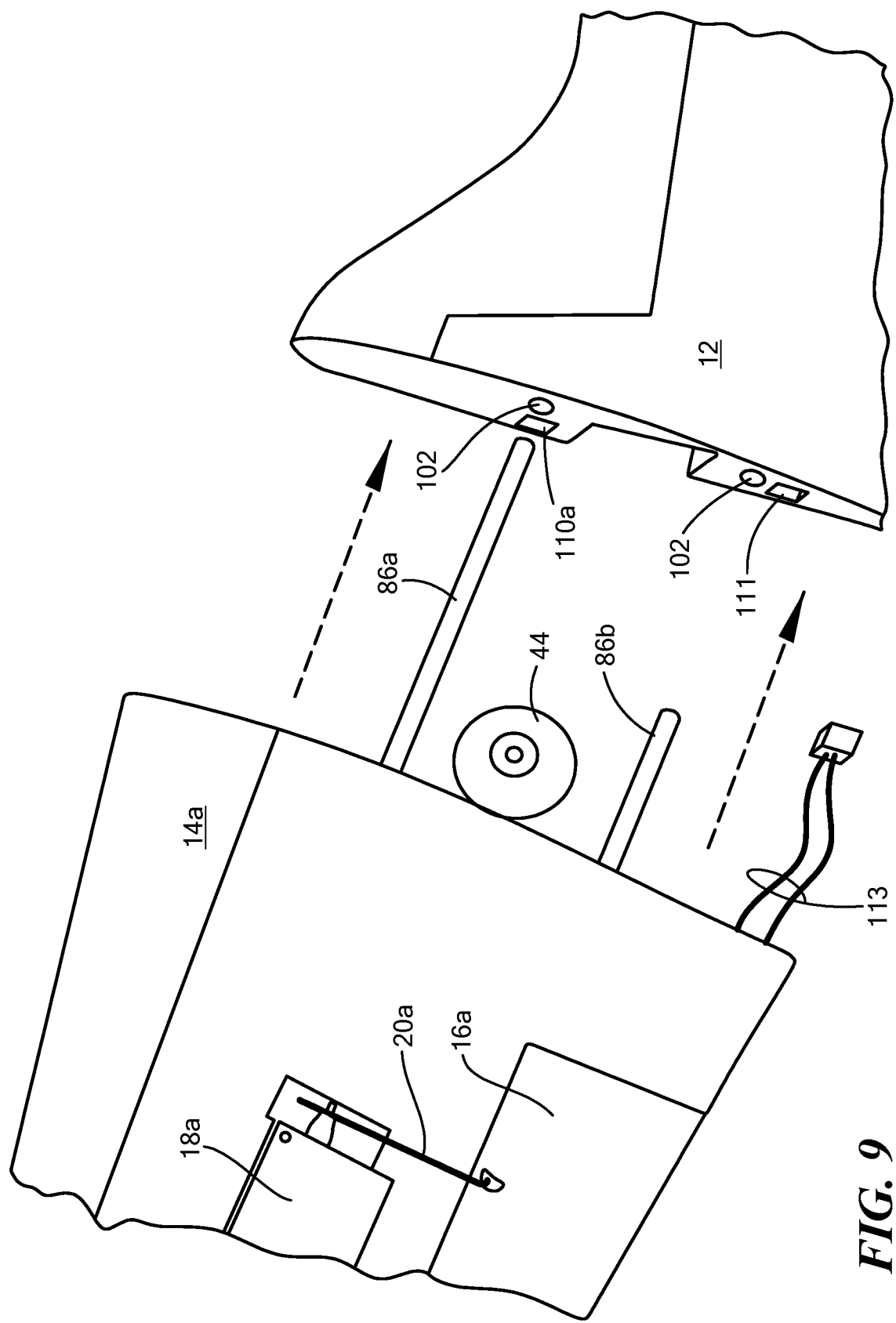
FIG. 9 is a schematic three dimensional top view showing a wing being attached to the fuselage body.

For transport, the wings may be removable with respect to the fuselage and the tail sections may be removable with respect to the wings. As shown in the FIG. 9, left wing 14a spar tubes 86a and 86b sections are received within tube sections 102 connected to the fuselage frame and there are means for removeably affixing the wing to the fuselage such as one or more magnets 110a set in the fuselage 12 and a corresponding magnet (or ferromagnetic material) is set in wing 14a (or vice versa). Connector 111 in the wing receives a connector associated with conductors 113 leading to the wing elevon motor and landing gear motor controlled by the on-board controller subsystem discussed below.

Figure 10A:
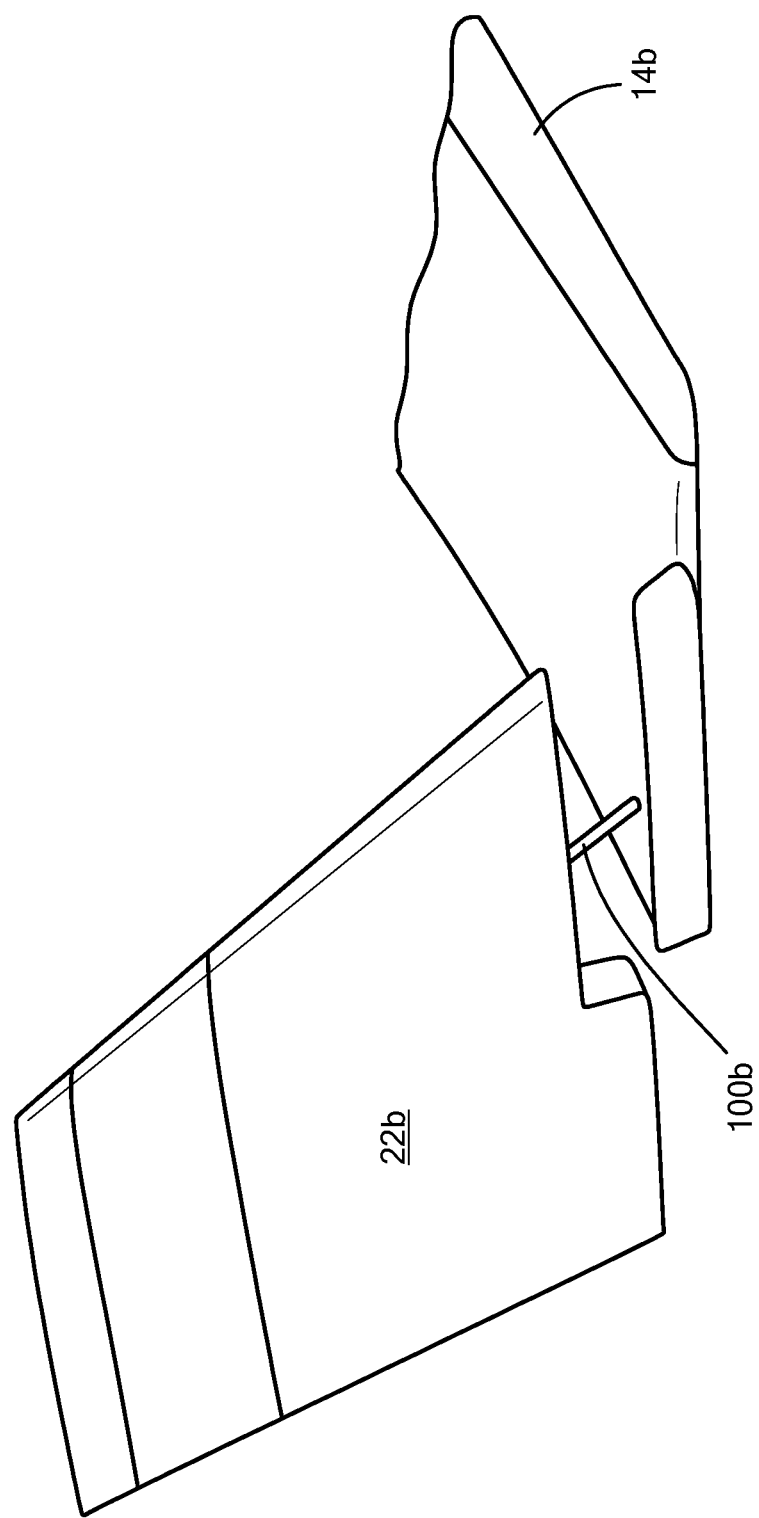
FIGS. 10A and 10B are schematic three dimensional views showing a tail section being coupled to a wing.
Figure 10B:
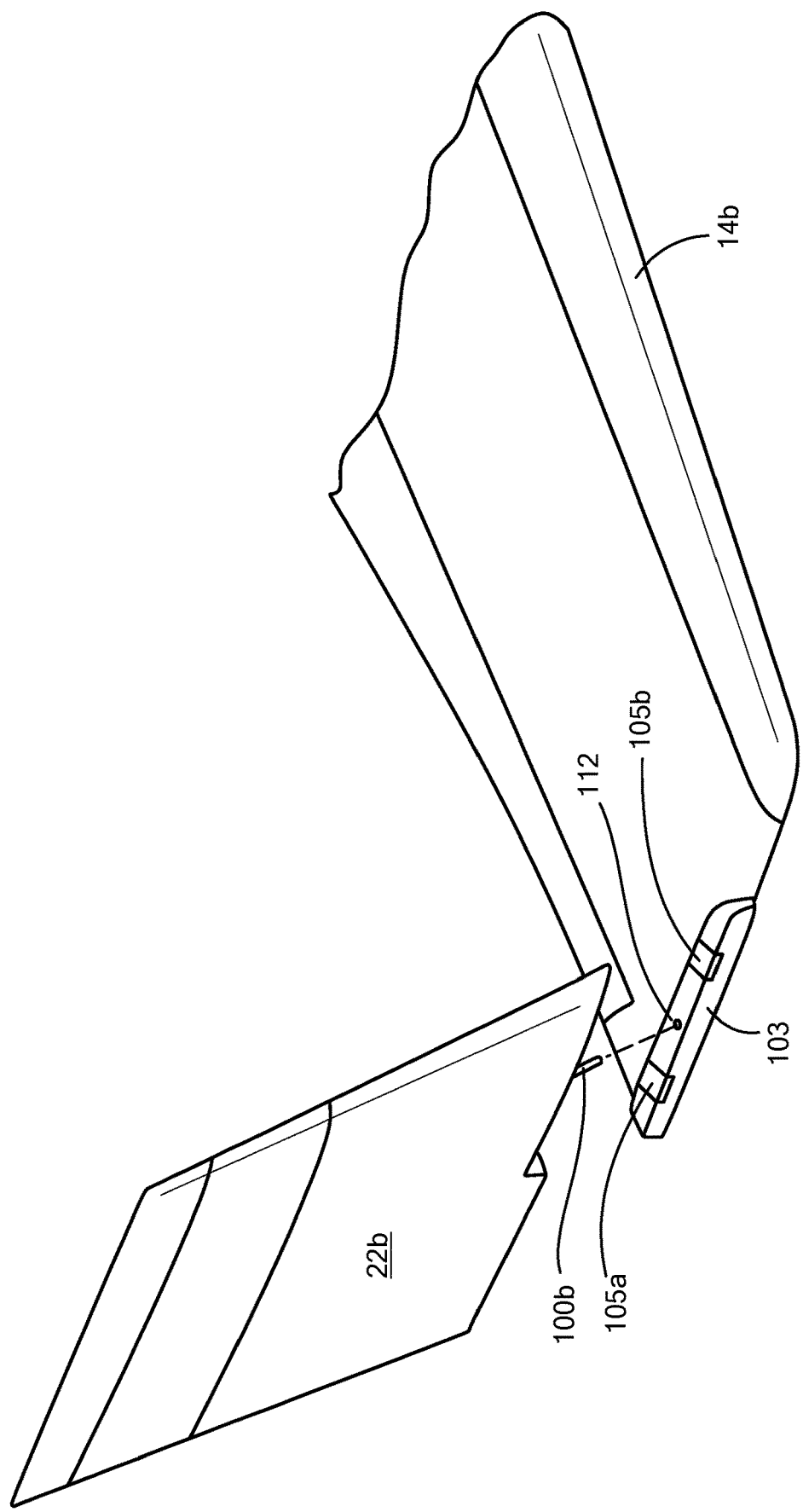

Tail 22b, FIG. 10 is releasably coupled to wing 14b using a similar technique. Carbon tube 100b of tail 22b is received in a plastic insert 112 located at the wing tip 103. FIG. 10B also shows wing tip magnets 105a and 105b. One or more magnets may be set in tail 22b and corresponding magnets (or ferromagnetic members) are set in wing 14b (or vice versa).

Figure 11:
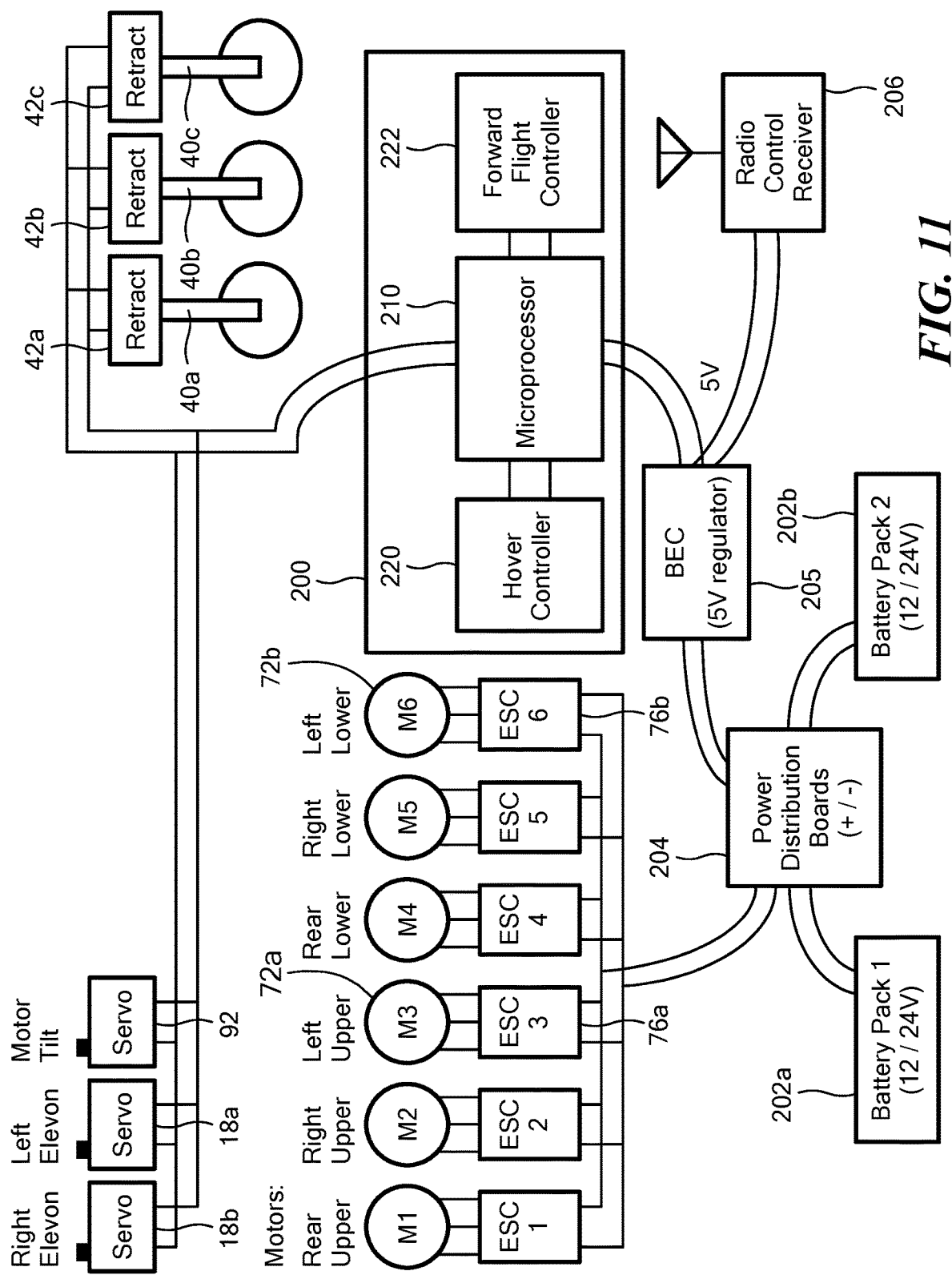
FIG. 11 is a block diagram showing the primary components associated with electronics, motors, and power subsystems in one example.

On-board controller subsystem 200, FIG. 11 (including, for example, a PixHawk) is used to control the various motors powered by battery packs 202a and 202b via power distribution circuitry 204 and voltage regulator 205. A radio receiver 206 or transceiver receives command signals wirelessly from an operator control unit transmitter (207, FIG. 12) and, in response electronics section 200) controls the propeller motors 72 by providing the appropriate voltages to each electronic speed control circuit chip 76 associated with each propeller motor, b) controls the servo motors 18 driving the elevons 20, c) controls tilt motor 92 which reorients the forward propulsion units by rotating shaft 32, FIG. 7, and d) controls the gear retraction/extension motors 42, FIG. 11.

Electronics section 200 enables the customer to choose various hover flight controllers 220 and/or forward flight controllers 222 for inclusion in the UAV in order to automate or partially automate the various flying operations.

In but one example, if on-board radio 206 receives a hover command, a microprocessor 210 within electronics section 200 functions to automatically cooperate with hover controller 220 to control tilt motor 92 to orient the forward propulsion units in the vertical orientation (see FIG. 1) and to control the propeller motors 72 and elevon motors 18 to cause the UAV to hover. If radio 206 receives a forward flight command, microprocessor 210 controls the tilt motor 92 to orient the forward propulsion units in the horizontal position (see FIG. 2) and disables the rear propulsion unit propeller motors. The landing gear is extended and retracted upon command.

Figure 12:
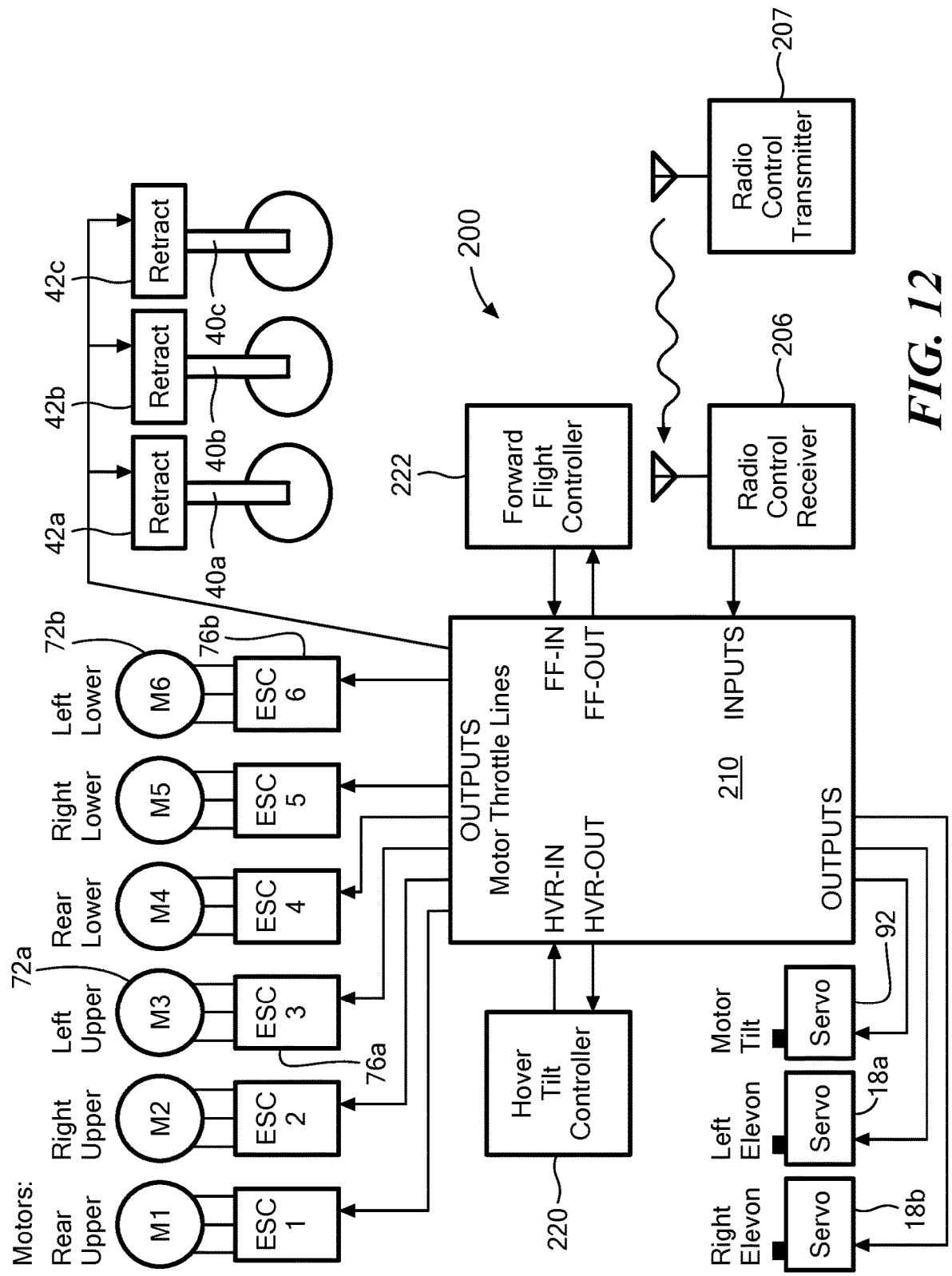
FIG. 12 is a block diagram of the electronics section showing the control signals thereof.

Microprocessor 210, FIGS. 11-12 thus provides signals to the hover controller 220 and forward flight controller 222 based on the commands it receives from the radio receiver 206 and receives signals from hover controller 220 and forward flight controller 222 to then control the various UAV motors. As such, microprocessor 210 may be used to act as an interface between the radio receiver commands, the flight controllers installed, and the UAV motors controlling the props, elevons, forward propulsion unit tilt motor, and the landing gear.

Figure 13:
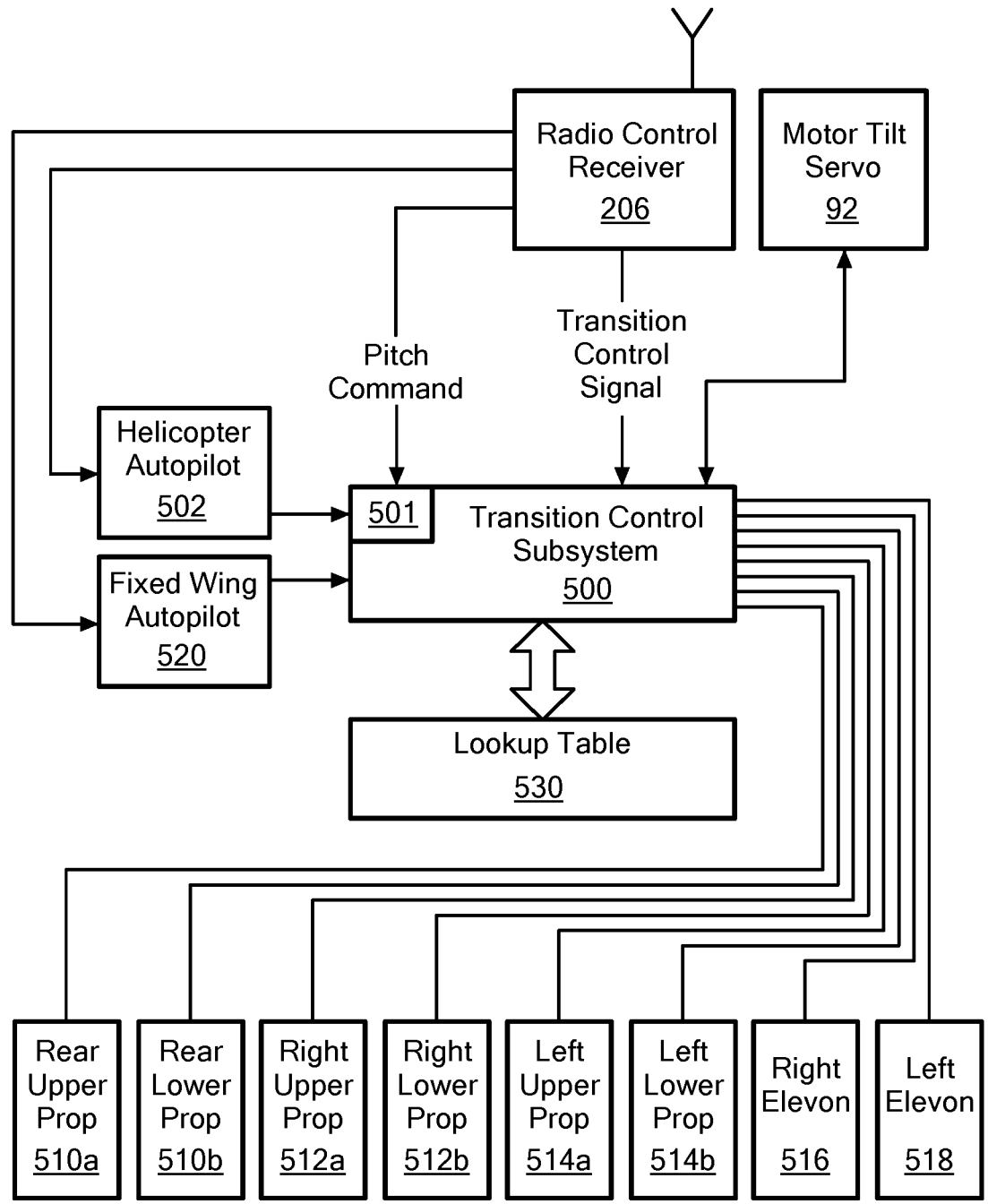
FIG. 13 is a block diagram showing an example of the inputs to and outputs from a transition control subsystem in accordance with aspects of the invention.

The VTOL aircraft described above and/or other similar remotely controlled VTOL aircraft may further include a transition control subsystem 500, FIG. 13 which may be a part of on-board controller subsystem 200, FIG. 11 (e.g., computer instructions stored in memory and operating on microprocessor 210, FIGS. 11-12). In one example, a single autopilot unit (e.g., a PixHawk) is used and includes a variety of sensors as is known in the art. The helicopter or hover autopilot subsystem software 502, FIG. 13, and the fixed wing autopilot subsystem software 520 run on one or more processors of the autopilot unit and the transition control subsystem software runs on a processor of the unit transition control subsystem. The software, however, may be embodied in other microprocessors, microcontrollers, application specific integrated circuits, processing logic, and the like preferably on-board the aircraft.

The transition control subsystem 500 functions to smoothly transition the aircraft between the hover and forward flight modes. In one example, the helicopter (e.g., hover mode) autopilot subsystem software 502 outputs helicopter control signals to the aircraft's controls such as rear upper and lower prop electric speed control chips and motors 510a, 510b, forward right upper and lower prop electronic speed control chips and motors 512a, 512b, forward left upper and lower prop electronic speed control chips and motors 514a and 514b, and the actuators (e.g., motors) controlling right elevon 516 and left elevon 518. Different types of aircraft, however, may have different types of controls. During the hover mode, transition axle motor 92 may also be controlled via a thrust vectoring subsystem disclosed below.

In the hover flight mode under the control of helicopter autopilot, the difference between the rpm of the front and rear propellers is preferably used for pitch control, the difference between the rpm of the left and right propellers is preferably used for roll control, the difference between the rpm of the three clockwise and three counter-clockwise spinning propellers is preferably used to control yaw, and the elevons are adjusted for wind gust control. For example, increasing the rpm of the forward left propellers relative to the forward right propellers causes the aircraft to roll right and increasing the rpm of the three clockwise spinning props relative to the three counterclockwise rotating props causes the aircraft to yaw counterclockwise.

The transition axle 32, FIG. 7 in the hover mode is usually only moved a small amount by controlling motor 92, FIGS. 7 and 13. While the forward right and left propellers are normally oriented upward (0°), the helicopter autopilot may rotate the transition axle as needed to vector thrust from the forward motors aft. This thrust vectoring allows the aircraft to achieve higher airspeeds in hover mode than would otherwise be possible.

In the forward flight mode, fixed wing autopilot subsystem software 520 outputs fixed wing control signals to the aircrafts' controls 510, 512, 514, 516, 518, and 92. For example the motor tilt servo 92 may be energized to rotate the transition axle 80° to orient the forward props in the forward flight direction. Aft or rear props 510a, 510b may be held at zero rpm. The elevons 516 and 518 are used for roll and pitch control. Forward prop differential control is used for yaw control. In other VTOL aircraft, the helicopter and fixed wing control signals may be different.

Transition control subsystem 500 receives these control signals from the helicopter control mode and the fixed wing control mode and preferably adjusts them based on the state of the transition of the forward props (e.g., the angle of transition axle 32, FIG. 7.

Typically, a user radio control transmitter 207, FIG. 12 or transceiver is used to transmit a signal to onboard radio control receiver 206, FIGS. 12 and 13 that a transition is requested. This transition control signal is input to the logic of transition control subsystem 500. The angle of the transition axle 32, FIG. 7 and thus the orientation of the forward props is also input to transition control subsystem 500.

In one preferred design, the computer instructions of transition control subsystem 500 calculate control signals to be applied to the VTOL aircraft controls as a function of a transition percentage and weighting factors applied to the helicopter control signals and the fixed wing control signals. Transition control subsystem 500 then applies the calculated control signals to the VTOL aircraft controls (for example, rear upper and lower props 510a, 510b, forward right upper and right lower props 512a, 512b, forward left upper and left lower props 514a, 514b, and right and left elevons 516 and 518).

In one example, lookup table 530 is used (and stored in a database in a memory associated with transition control subsystem 500). Table 1 below is an example of the data of such a lookup table where the transition state is a percentage (0% is the helicopter flight mode, 100% is fixed wing flight mode) and a weighting factor for the helicopter mode and the fixed wing mode are shown for each transition state percentage.

TABLE 1

| Transition State % | Factor Helicopter | Factor Fixed Wing |
|---|---|---|
| 0 | 1 | 0 |
| 10 | 0.9 | 0.1 |
| 20 | 0.8 | 0.2 |
| 30 | 0.7 | 0.3 |
| 40 | 0.6 | 0.4 |
| 50 | 0.5 | 0.5 |
| 60 | 0.4 | 0.6 |
| 70 | 0.3 | 0.7 |
| 80 | 0.2 | 0.8 |
| 90 | 0.1 | 0.9 |
| 100 | 0 | 1 |

In general, the transition control subsystem may calculate, for each control signal output by the helicopter autopilot and the fixed wing autopilot, a new control signal thus:

Motor Control Signal=Control Signal$_{heli}$·Factor$_{heli}$+
Control Signal$_{fixed\ wing}$·(1−Factor$_{heli}$)     (1a)

Elevon Control Signal=Control Signal$_{heli}$·(1−Factor$_{fixed\ wing}$)+Control Signal$_{fixed\ wing}$·Factor$_{fixed\ wing}$     (1b)

Suppose, for example, that a control signal is the rpm of the right upper and lower props 512a, 512b. Helicopter autopilot 502 outputs an rpm value of 1800 rpm but fixed wing autopilot 520 outputs an rpm value of 2800 rpm. Based on the state of the transition (the rotation of the transition axle), transition control subsystem 500 may use equation 1a to calculate:

rpm=1800·0.4+2800·0.6=2400 rpm.     (2)

Transition control subsystem 500 will then output a signal to right upper and lower props 512a, 512b to cause them to rotate at 2400 rpm (by sending the appropriate signals, for example, to the electronic speed control chips of the right upper and lower propellers).

In another example, suppose that the control signal is the degree of downward deflection of right elevon 516. Helicopter autopilot 502 outputs a downward deflection of 5° and fixed wing autopilot 520 outputs a downward deflection of 30°. At a given transition state, the respective weighting factors are 0.8 and 0.2. Thus, according to equation (1b), the transition control subsystem calculates a downward deflection angle detection angle of:

5·0.8+30·0.2=10°     (3)

Transition control subsystem 500 then outputs a signal to the motor controlling right elevon 516 to deflect the elevon 10° downward.

Table 1 is exemplary only and at different transition states for different control signals the weighting factors may vary. The weighting factors may also vary depending on the VTOL aircraft design. Other fuzzy control systems may be used to determine the appropriate control signals based on the outputs of the autopilots.

Figure 14:
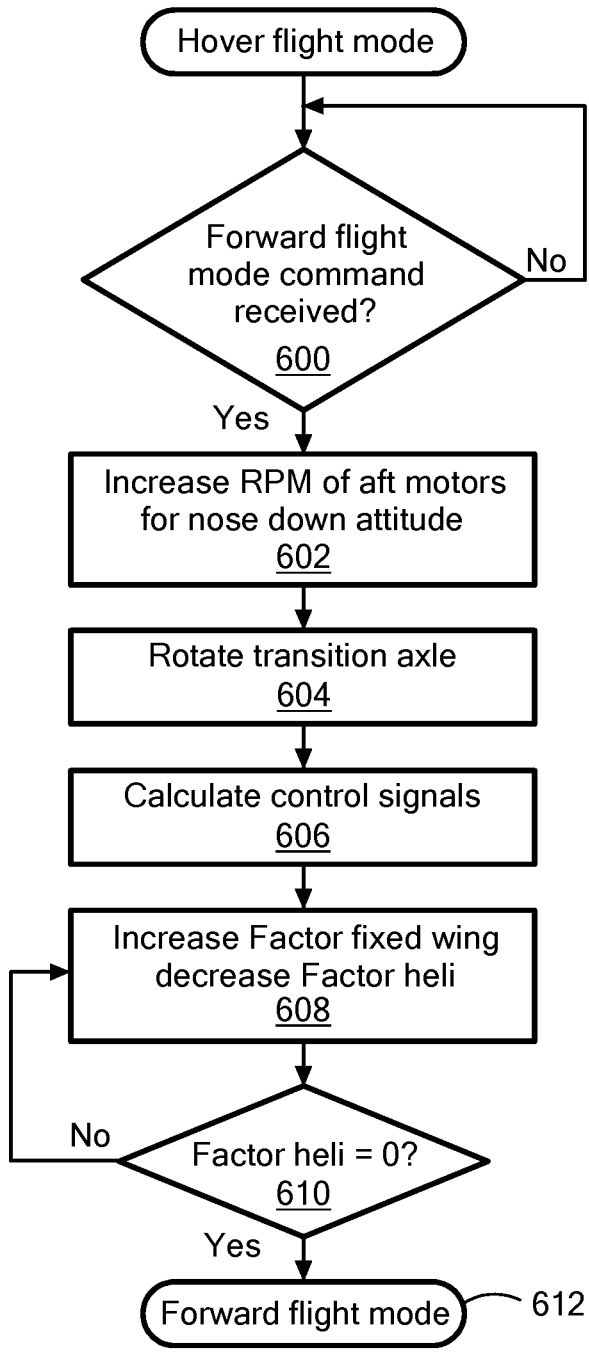
FIG. 14 is a flow chart depicting the primary steps associated with the programming of the transition control subsystem of FIG. 15 in a transition from the hover mode to the forward flight mode.

FIG. 14 shows the configuration of exemplary software operating on transition control subsystem 500, FIG. 13. The aircraft is in the hover mode with helicopter autopilot 502 controlling the aircraft based on inputs made by the pilot operator and a forward flight mode command is received by receiver 206, step 600, FIG. 14. Preferably, during the transition period, no further inputs from the operator are accepted and pilot operator inputs are ignored or suppressed.

First, but optionally, a nose down attitude is achieved by increasing the rpm of the aft or rear props, step 602 to build aircraft airspeed for a short period of time, for example, two seconds.

Rotation of the transition axle then begins, step 604. Full rotation from 0° to 80° may take a short time, for example, three seconds. Rotation may occur at a constant speed (e.g., 27°/sec.) The control signals output to the aircraft controls (propeller motors, elevon motors, and the like) are calculated and applied as step 606 (see equations 1a and 1b above). Typically the weighting factors applied to the output of the fixed wing autopilot are increased while the weighting factors applied to the output of the helicopter autopilot are decreased, step 608 until the full transition is made, step 610 and the forward flight mode is achieved, step 612 and the forward flight control resumes (e.g., the fixed wing autopilot 520 is in control of the aircraft based on commands received from the pilot's operator control unit.

Figure 15:
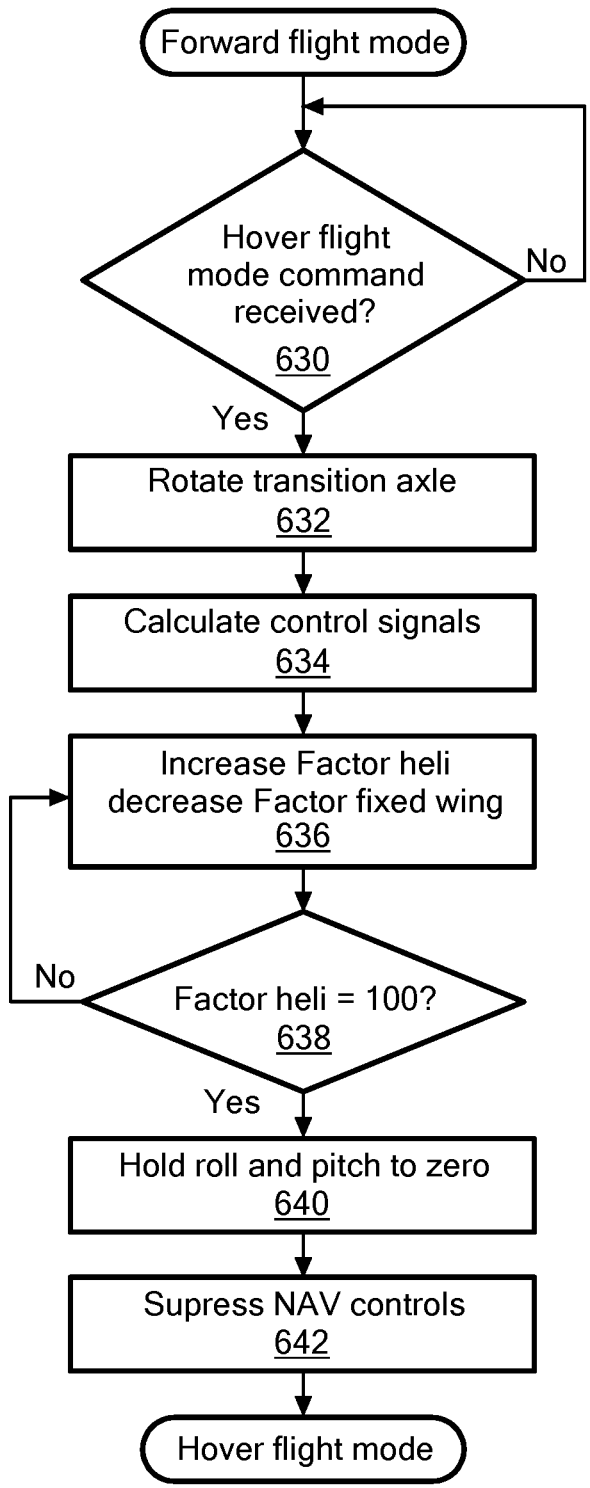
FIG. 15 is a flow chart depicting the primary steps associated with the programming of the transition control subsystem of FIG. 15 in a transition from the forward flight mode to the hover flight mode.

FIG. 15 shows exemplary steps associated with transitioning from the forward flight mode to the hover flight mode. A hover flight mode flight command is received, step 630 and the transition axle is caused to begin rotating, step 632. Again, full rotation from 80° to 0° may take three seconds and rotation may occur at a constant speed. The control signals output to the aircraft controls are calculated and applied at step 634 and the weighting factors applied to the output of the fixed wing autopilot are decreased while the weighting factors applied to the output of the helicopter autopilot are increased, step 636. Once the full helicopter control mode is achieved, step 638, pitch and roll controls are held to zero, step 640 and any navigation controls are suppressed, step 642. Holding the roll and pitch to zero allows the aircraft to naturally decelerate at a result of aerodynamic drag and the aircraft typically coasts to a hovering stop if pitch and roll are held to zero for approximately two seconds. If the aircraft is operating in an autonomous flight mode, a three second navigation suppression period while holding pitch and roll to zero is preferred. This prevents the hover mode navigation controllers from coming active while at high air speed. This three second period of navigation suppression allows the aircraft to further decelerate as a result of aerodynamic drag. After the navigation suppression, the hover mode navigation controllers can be relied upon to control ground speed.

Figure 16:
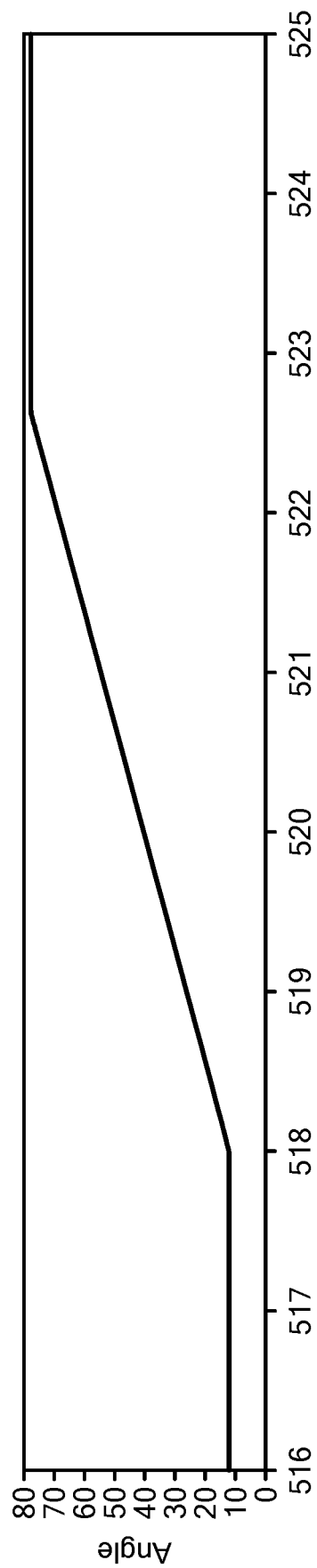
FIG. 16 is a graph showing the forward propellers transition axle rotation over time during a transition.

FIG. 16 shows how that transition axle may move during a transition from hover to forward flight. The x-axis is time in minutes. Each tick mark is approximately half a second. The y-axis is angular deflection of the transition axle in degrees. From time 5.16 to 5.18 seconds, the transition axle is tiled forward 12 degrees. This is the thrust vectoring part of the transition used to build airspeed. At time 5.18 the transition axle begins a smooth rotation to 80 degrees deflection which is the standard deflection when in the forward flight mode.

In the hover flight mode, the flight control system may use differential thrust for attitude (roll, pitch, and yaw) control. In the forward flight mode, differential thrust may only be used to control yaw as roll and pitch are controlled using the elevons. When transitioning, differential thrust between the left and right prop motors effects both roll and yaw. The transition control subsystem accounts for this coupling between roll and yaw during the transition process using trigonometric rotations based on the angle of the transition axle.

Also featured is a thrust vectoring subsystem 501, FIG. 13 (e.g., computer instructions operating on an on-board controller 200, FIG. 11, or transition control subsystem 500, FIG. 13) which, in the helicopter or hover mode, receives a pitch down command and in response calculates a forward prop deflection angle as a function of the nose down pitch angle.

In the helicopter or hovering mode, the aircraft is controlled in translation motion (i.e., forwards, sideways, backwards) by vectoring thrust. For example, to move forward, the aircraft vectors some amount of its thrust aft (to the aft propeller(s)). In order to move forward quickly, a large amount of thrust must be vectored to account for drag. In one example, thrust is vectored by rolling and pitching the entire aircraft. To move forwards, the aircraft pitches nose down by increasing the rpm of the aft propeller or propellers relative to the forward propellers. At high speeds, the aircraft requires a high nose down pitch angle. At such high nose down attitudes, the wings 14, FIG. 1, generate negative lift (lift pushing the aircraft towards the ground). This negative lift is undesirable because the forward and aft propeller motors must produce more thrust to counteract the negative lift. The result is less flight time because the onboard batteries are being discharged more quickly.

Figure 17:
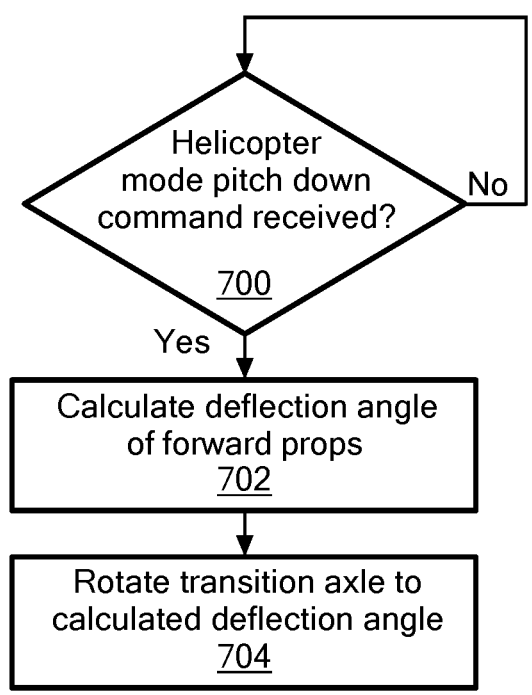
FIG. 17 is a flow chart depicting the primary steps associated with an example of the programming of the thrust vectoring subsystem in accordance with aspects of the invention.

In another example, in the helicopter mode, a pitch down command is received either from the autopilot or an on-board receiver, step 700 FIG. 17. For example, the pilot may be using a joystick on transmitter 207, FIG. 12 to pitch the nose of the VTOL aircraft down and this pitch down command is received by on-board receiver 206, FIGS. 12 and 13.

The thrust vectoring subsystem then calculates a deflection angle of the forward props, step 702, FIG. 17.

In one example, the deflection angle θ is calculated as follows:

$$\theta = k \cdot \alpha. \quad (4)$$

where k is a constant and α is the nose down pitch angle commanded.

The deflection angle θ may vary between about 12 to 30 degrees. For example, if the nose down pitch angle command is 15° and the constant k is 0.9, then the deflection angle calculated is 13.5° and in step 704 the transition axle 32, FIG. 7 is rotated 13.5° so the props of the forward propulsion units 30a and 30b now face partially forward.

The thrust vectoring subsystem, in this example, thus sends a signal which energizes transition axle motor 92, FIGS. 7 and 13 to rotate the transition axle to the calculated deflection angle.

In this way, rotation of the transition axle vectors thrust for faster forward flight in the helicopter mode to assist the aircraft when moving forwards quickly to reduce the amount of thrust required to counteract negative lift and thus using less battery energy and increasing flight time. A commanded nose down angle is used to detect when it is necessary to vector thrust and equation 4 may be used by the flight control system to determine how much to vector thrust.

In the hover mode, the lowest level control loop in the pitch axis is a pitch angle tracker. A higher level controller (e.g., a waypoint following controller or the human pilot) commands a desired pitch angle. The pitch angle tracker is responsible for determining which motor outputs are needed to track the desired pitch angle. The transition axle thrust vectoring logic uses the commanded pitch angle to determine when and how much to deflect the transition axle. If the command is to pitch the nose up, no thrust vectoring takes place. If the command is pitch the nose down, the transition axle is rotated in proportion to the nose down command. When a nose down attitude is commanded, the nose lowers and the transition axle rotates.

Mechanizing the thrust vectoring logic in this way allows the thrust vectoring to work in both the manual and autonomous flight modes. In manual flight, the human pilot uses a joystick like device to fly the aircraft. The pitch input sets the desired pitch angle of the aircraft which the thrust vectoring logic uses to determine how much to deflect the transition axle. In autonomous flight, the position control software calculates the roll and pitch angles needed to maintain position. Again, the thrust vectoring logic uses the desired pitch angle to deflect the transition axle. Typically, the aircraft uses constant pitch blades and affects the lift produced by adjusting propeller speed.

The thrust vectoring subsystem logic also assists aircraft control in a loitering mode during windy conditions where, to hold a given position, the aircraft requires a sufficiently high airspeed requiring a nose down pitch attitude. Again, when the nose down pitch attitude is received the subsystem automatically adjusts the angle of the forward prop axle.

At any time a pitch up attitude command is received, the rpm of the aft prop(s) is reduced and the deflection angle of the forward prop axle is rotated back so the forward props face upwards parallel to the ground in the helicopter mode.

In the forward flight mode, the aircraft's four front motors and props rotate so that they propel the aircraft forward. While most aircraft have motors or engines that are rigidly fixed to the aircraft in the preferred embodiment the motors can be tilted via the transition axle. The flight control software can take advantage of this and adjust the motor angles in flight. The intent of adjusting the motor angle is to reduce trim drag, thus increasing flight time.

Various factors can affect which motor angle is most efficient. They include, but are not limited to, aircraft mass, center of gravity, drag caused by payloads attached beneath the aircraft, servo drift, wing flex, and/or poorly calibrated elevons or transition mechanism.

Many of the factors which affect the most efficient motor angle are unknown to the autopilot. That is, the autopilot cannot simply use a look up table of aircraft mass and center of gravity location to see which angle is best because the autopilot is unaware of the aircraft's mass properties. The forward flight motor angle trimming algorithm determines the best motor angle by using other means.

Figure 18:
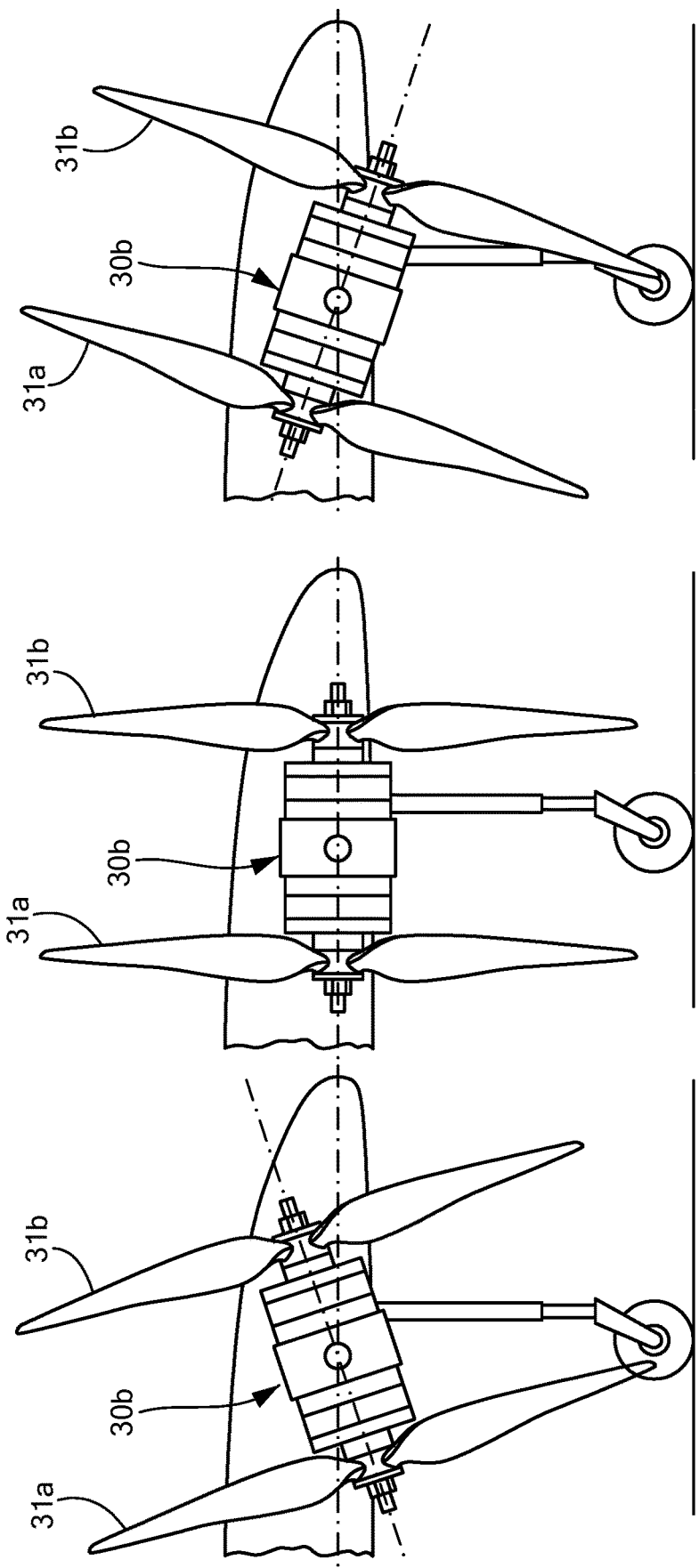
FIGS. 18A-18C show the forward props of the aircraft positioned at different angles for the forward flight mode in an example of the invention where a forward flight trimming subsystem algorithm is used.

The forward prop motor angles can be adjusted more nose up (FIG. 18A, e.g., 70°), at a nominal forward flight motor angle (FIG. 18B, e.g., 80°), and adjusted more nose down (FIG. 18C, e.g., 90°). In one example, forward flight motor angle is measured from the hover position. 0 degrees is motors pointed straight up (nominal hover position) and 80 degrees is forward (nominal forward flight position).

For stability reasons almost all fixed wing aircraft are nose heavy. That is, in flight the aircraft needs a force to hold the nose up. In most aircraft this is done using aerodynamic control surfaces (e.g., elevons or an elevator) near the rear of the aircraft. Generating an aerodynamic down force near the rear of the aircraft has the effect of pushing the nose up. This is effective at generating the needed force but has the downside of creating aerodynamic drag which reduces efficiency and flight time.

Figure 19:
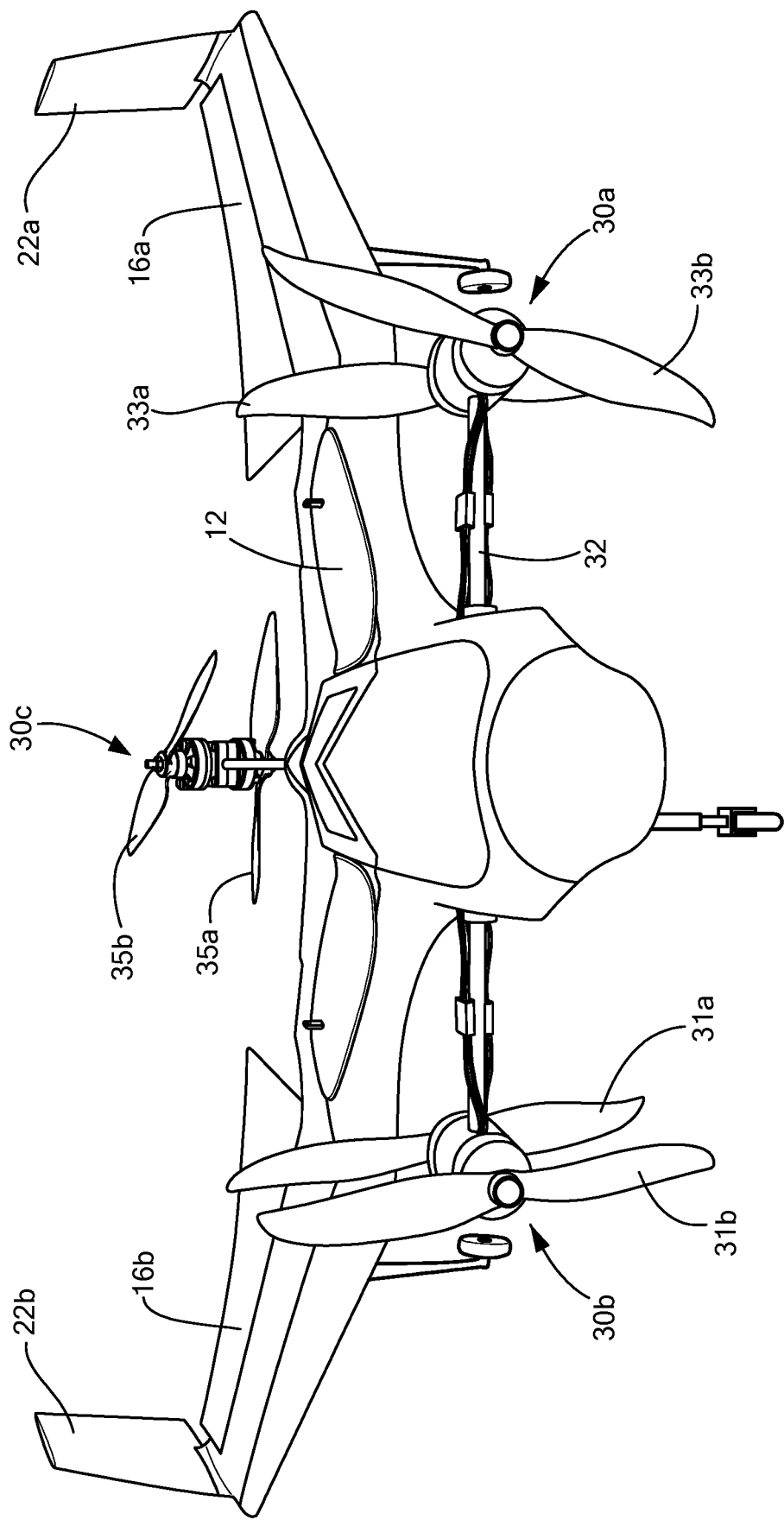
FIGS. 19-20 shows an adjustment to the angle of the forward props for extended flight times.

An example of the aircraft with the aerodynamic control surfaces 16a and 16b (e.g., elevons) pushing down on the rear portion of the aircraft to hold the nose up in forward flight is shown in FIG. 19. Control surface deflection has been exaggerated for clarity.

An alternative to pushing the rear portion of the aircraft down is to pull the nose of the aircraft up. In the preferred embodiment this can be accomplished by angling the forward motors and props to point slightly nose up. The algorithm of the thrust vectoring subsystem adjusts the front motor angle such that the aircraft maintains an efficient trim configuration.

Figure 20:
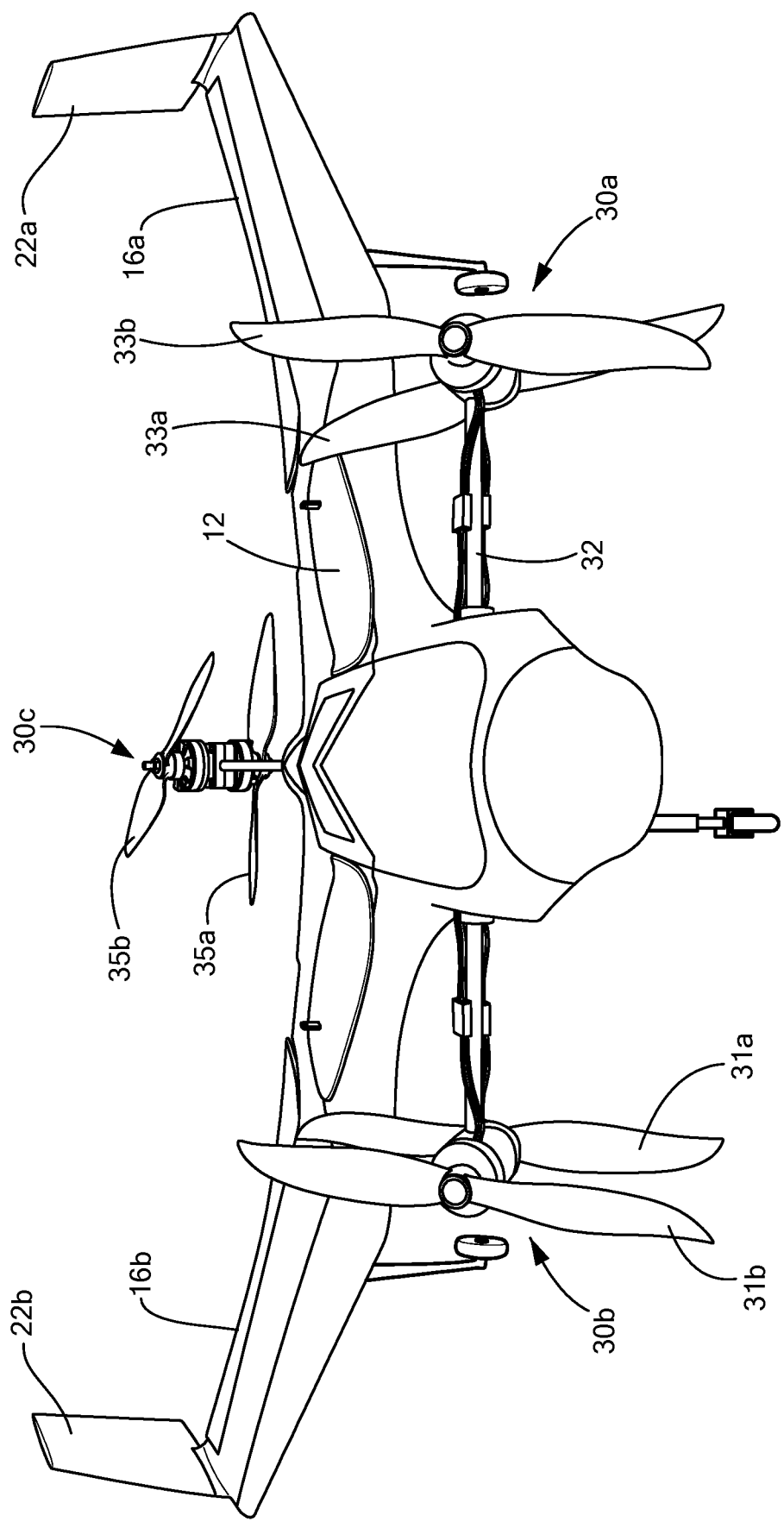

An example of the aircraft where the forward motors and props are deflected to provide a nose up torque is shown in FIG. 20. Note how the aerodynamic control surfaces 16a and 16b are streamlined, resulting in less drag. The forward motor angle has been exaggerated for clarity. The result is longer flight time for a given battery charge.

In the forward flight mode, pitch tracking (that is, holding a specified pitch angle) may be accomplished using a PID control software algorithm (e.g., running on electronics section 200).

The PID controller algorithm is preferably based on three components: proportional (P), Integral (I), Derivative (D) terms. The forward flight motor trimming algorithm may use the I term which keeps track of the sum of the pitch error over time.

The forward flight motor angle trimming logic may be feed forward based on the integral component of the forward flight pitch tracking PID term. The equation for the relationship, in one example is:

(forward flight motor angle)=(trim motor angle)+ (experimentally determined constant)·(forward flight pitch tracking PID integral component). (5)

Assuming a trim motor angle of 80° and an experimentally determined constant of 0.7, the equation becomes:

(forward flight motor angle)=(80 degrees)+(0.7)·(forward flight pitch tracking PID integral component). (6)

Figure 21:
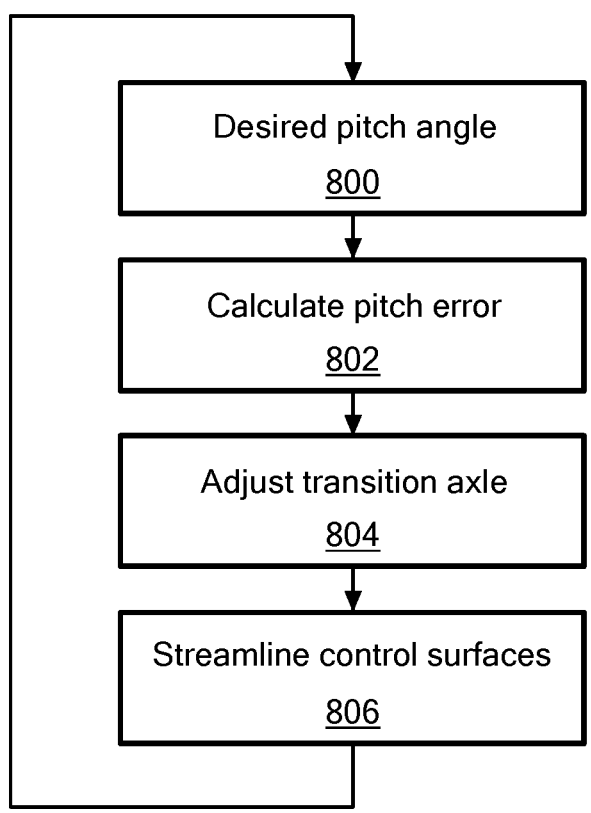
FIG. 21 is a flow chart depicting the primary steps associated with the operation of the forward flight trimming subsystem algorithm.

As shown in FIG. 21, the desired pitch angle is determined (based on autopilot or operator input), step 800 and the pitch error is calculated, step 802 using the PID control output. The forward prop angle is then adjusted, step 804. Adjusting the forward prop angle will, over time, decrease the error signal fed to the pitch PID software. This causes a reduction in the commanded position of the control surfaces.

Thus, a forward flight trimming subsystem (e.g., logic associated with electronics section 200, FIG. 11, and/or transition control subsystem 500, FIG. 13) rotates the transition axle 32, FIG. 20 upwards in this particular example producing a nose up torque in response to, for example, a nose heavy aircraft which otherwise would require deflected control surfaces (see deflected elevons 16a and 16b, FIG. 19) to maintain straight and level flight in this particular example. The forward flight trimming subsystem reduces drag and increases flight time by adjusting the angle of the transition axle and the forward props in forward flight and also streamlines the aerodynamic control surfaces.

In FIG. 19, for example, the forward props are at nominal 80° and the elevons 16a and 16b are deflected trailing edge up 5-10° to maintain level flight. The forward flight subsystem, however, as shown in FIG. 20 rotates the transition axle so the forward props are at 70° and the elevons are not deflected thus streamlining the control surfaces and maintaining level flight with a nose heavy aircraft by providing a nose up torque via the upward oriented angle of the forward props.

In equation 5, the trim motor angle may be set (e.g., at 80°—a nominal value for example with the forward props oriented perpendicular to the ground) based on the thrust vector through the center of mass of the aircraft and the constant in the equation (e.g., 0.7) may be set by experiment. In general, the variable in the equation, (namely, the forward flight pitch tracking PID integral component used in this particular example) increases as weight of the nose of the aircraft increases. But, as noted above, other factors will affect the variable in the equation.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A remotely controlled VTOL aircraft comprising:
   an autopilot subsystem outputting helicopter control signals;
   an autopilot subsystem outputting fixed wing control signals;
   a transition control subsystem configured to receive said helicopter control signals, said fixed wing control signals, and a transition control signal and including computer instructions which automatically:
   calculate control signals to be applied to the VTOL aircraft controls as a function of the transition percentage and weighting factors applied to said helicopter control signals and said fixed wing control signals, and
   applying said calculated control signals to said VTOL aircraft controls during a transition period.

2. The remotely controlled VTOL aircraft of claim 1 in which in a transition from hover flight mode to forward flight mode the controller is programmed to increase the airspeed of the aircraft and then apply said calculated control signals.

3. The remotely controlled VTOL aircraft of claim 1 in which in a transition from hover flight mode to forward flight mode the computer instructions decrease the weighting factors applied to said helicopter control signals and increase the weighting factors applied to said fixed wing control signals.

4. The remotely controlled VTOL aircraft of claim 1 in which in a transition from the forward flight mode to the hover flight mode the computer instructions increase the weighting factors applied to said helicopter control signals and decrease the weighting factors applied to the fixed wing control signals.

5. The remotely controlled VTOL aircraft of claim 1 in which in a transition from forward flight mode to hover flight mode, the computer instructions suppress any navigation controls for a predetermined period of time.

6. The remotely controlled VTOL aircraft of claim 1 in which the VTOL aircraft includes right and left forward propeller motors and props on a transition axle rotatable via a motor and the control subsystem is programmed to control said motor to rotate the transition axle during the transition.

7. The remotely controlled VTOL aircraft of claim 6 in which the transition axle is rotated at a constant speed during the transition period.

8. The remotely controlled VTOL aircraft of claim 6 in which the VTOL aircraft further includes an aft propeller motor and right and left elevon motors.

9. The remotely controlled VTOL aircraft of claim 8 in which the control signals are calculated for and applied to said right and left forward propeller motors, said aft propeller motor, and said right and left elevon motors.

10. The remotely controlled VTOL aircraft of claim 8 in which said autopilot subsystem outputting helicopter control signals controls the pitch of the VTOL aircraft via a difference between the rpm of the forward and aft propellers and controls the roll via a difference between the rpm of the left and right propeller.

11. The remotely controlled VTOL aircraft of claim 8 in which there are forward right, left, and aft counter rotating upper and lower propeller motors and props and the autopilot subsystem outputting helicopter control signals controls the yaw of the VTOL aircraft via a difference between the rpm of the counter rotating propellers.

12. The remotely controlled VTOL aircraft of claim 8 in which autopilot subsystem outputting fixed wing control signals controls the pitch and roll of the VTOL aircraft by adjusting the right, left, elevon motors and controls the yaw of the VTOL aircraft by differentially adjusting the rpm of the right and left forward propeller motors.

13. The remotely controlled VTOL aircraft of claim 6 further including a thrust vectoring subsystem responsive to a nose down pitch command and including computer instructions which automatically:
   calculate a forward prop deflection angle as a function of the nose down pitch angle, and
   deflects said forward props to said calculated deflection angle by rotating said transition axle.

14. The remotely controlled VTOL aircraft of claim 6 further including one or more aerodynamic control surfaces.

15. The remotely controlled VTOL aircraft of claim 14 in which said aerodynamic control surfaces include elevons.

16. The remotely controlled VTOL aircraft of claim 14 further including a forward flight trimming subsystem configured to rotate the transition axle in a forward flight mode to maintain an efficient trim configuration for said aerodynamic control surfaces.

17. The remotely controlled VTOL aircraft of claim 16 in which the forward flight trimming subsystem rotates the transition axle to provide a nose up torque and automatically streamlines said aerodynamic control surfaces.

18. The remotely controlled VTOL aircraft of claim 1 in which the aircraft further includes:
   a fuselage;
   removable wings coupled to the fuselage;
   retractable landing gear; and
   a wireless receiver for receiving command signals.

19. The remotely controlled VTOL aircraft of claim 18 in which the wings and fuselage are predominately made of foam.

20. The remotely controlled VTOL aircraft of claim 18 further including a removable tail section upstanding from and magnetically coupled to each wing.

21. The remotely controlled VTOL aircraft of claim 18 in which said fuselage includes a frame portion.

22. The remotely controlled VTOL aircraft of claim 21 further including one or more spars extending from the frame portion to within each wing.

23. The remotely controlled VTOL aircraft of claim 22 in which said one or more spars are in sections for decoupling each wing from the fuselage.

* * * * *